United States Patent
Nakamichi et al.

(10) Patent No.: US 8,695,051 B2
(45) Date of Patent: Apr. 8, 2014

(54) VIDEO QUALITY MONITORING METHOD, DISTRIBUTION SERVER, AND CLIENT

(75) Inventors: Koji Nakamichi, Kawasaki (JP); Satoshi Imai, Kawasaki (JP); Hiroshi Yamamoto, Kawasaki (JP); Toshio Soumiya, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 78 days.

(21) Appl. No.: 13/597,981

(22) Filed: Aug. 29, 2012

(65) Prior Publication Data

US 2012/0320222 A1 Dec. 20, 2012

Related U.S. Application Data

(60) Division of application No. 12/707,785, filed on Feb. 18, 2010, now Pat. No. 8,296,814, which is a continuation of application No. PCT/JP2007/066127, filed on Aug. 20, 2007.

(51) Int. Cl.
*H04N 7/173* (2011.01)

(52) U.S. Cl.
USPC .......................................... 725/107; 709/233

(58) Field of Classification Search
USPC .......................................... 725/107; 709/223
See application file for complete search history.

(56) References Cited

U.S. PATENT DOCUMENTS 5,752,166 A * 5/1998 Dorenbosch et al. ...... 455/67.11

FOREIGN PATENT DOCUMENTS

| JP | 2004-023115 | 1/2004 |
|---|---|---|
| JP | 2004-165821 | 6/2004 |
| JP | 2005-229214 | 8/2005 |
| JP | 2005277683 | 10/2005 |
| JP | 2006-157223 | 6/2006 |

OTHER PUBLICATIONS

International Search Report dated Sep. 25, 2007, from the corresponding International Application.
Recommendation ITU-R BT.500-11, Methodology for the subjective assessment of the quality of television pictures (1974-1978-1982-1986-1990-1992-1994-1995-1998-1998-2000-2002).
ITU-T Recommendation G.107, Series G: Transmission Systems and Media, Digital Systems and Networks, International Telephone Connections and Circuits—General Definitions, Mar. 2005.
ITU-T J.144, Series J: Cable Networks and Transmission of Television, Sound Programme and Other Multimedia Signals, Measurement of the Quality of Service, Mar. 2004.

(Continued)

*Primary Examiner* — Brian T Pendleton
*Assistant Examiner* — Olugbenga Idowu
(74) *Attorney, Agent, or Firm* — Katten Muchin Rosenman LLP

(57) ABSTRACT

A video quality monitoring method includes a distribution server measuring first video quality index values according to a full-reference method by comparing a video, distributed from the distribution server to a client through a network, with a degraded video, generated by causing multiple scenarios of quality degradation due to the network in the video in a pseudo manner, creating characteristic data of first quality degradation values, obtained by causing the quality degradation to vary with the scenarios at regular intervals, and the first video quality index values corresponding to the respective scenarios, and transmitting the characteristic data to the client; and the client measuring a second quality degradation value in the video distributed through the network, and calculating a second video quality index value, equivalent to a value according to the full-reference method, of the distributed video from the measured second quality degradation value and the characteristic data.

6 Claims, 19 Drawing Sheets

(56) References Cited

OTHER PUBLICATIONS

J. Welch, et al. "A Proposed Media Delivery Index (MDI)" Network Working Group, Request for Comments: 4445, Apr. 2006.
U.S. Office Action dated Apr. 12, 2012, from the corresponding U.S. Appl. No. 12/707,785.
Notice of Allowance dated Aug. 1, 2012, from the corresponding U.S. Appl. No. 12/707,785.
Japanese Office Action dated Aug. 28, 2012 from corresponding Japanese Application No. 2009-528901.

* cited by examiner

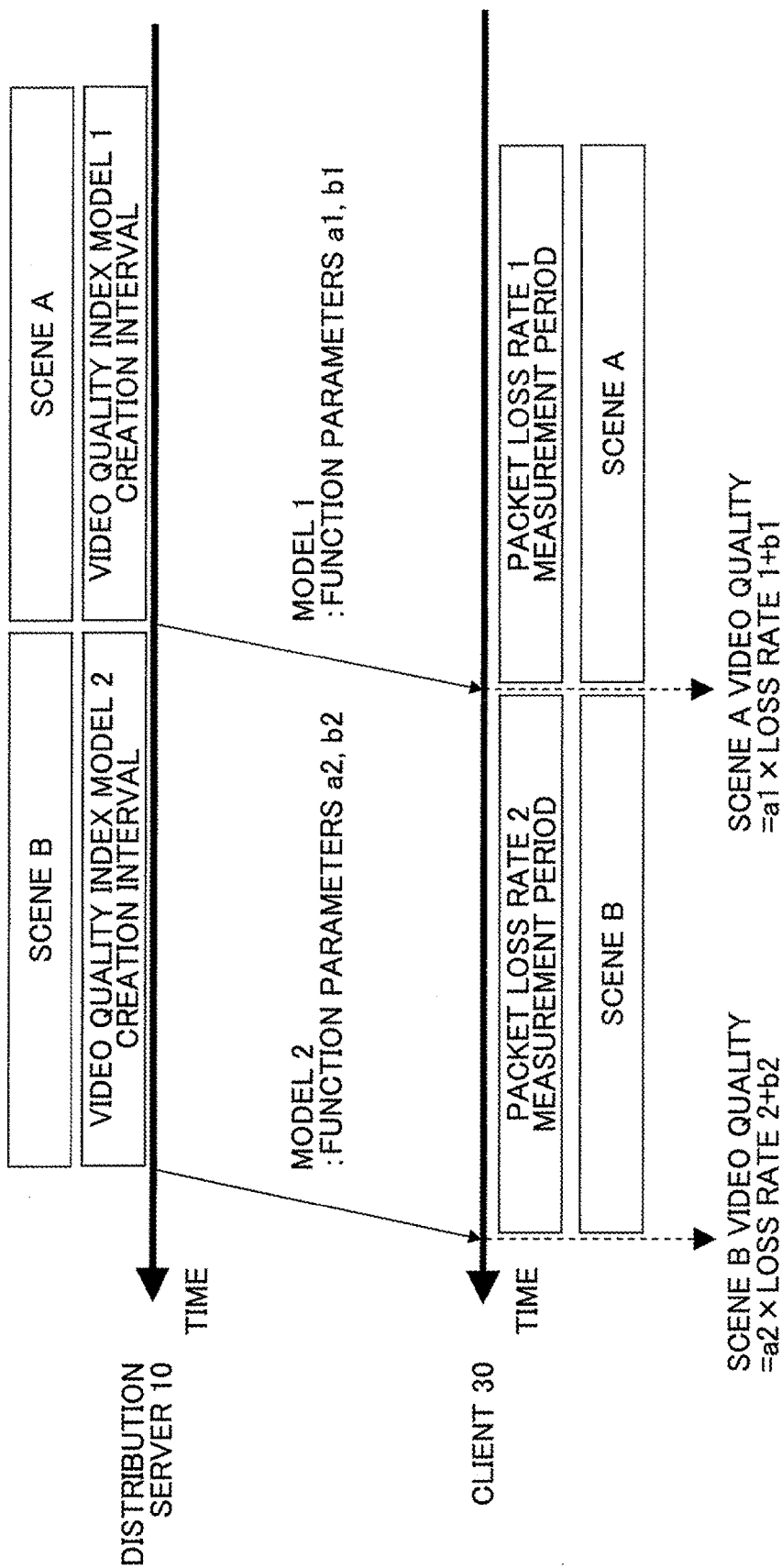

VIDEO QUALITY MONITORING METHOD, DISTRIBUTION SERVER, AND CLIENT

CROSS-REFERENCE TO RELATED APPLICATION(S)

This application is a continuation application filed under 35 U.S.C. 111(a) claiming benefit under 35 U.S.C. 120 and 365(c) of PCT International Application No. PCT/JP2007/066127, filed on Aug. 20, 2007, the entire contents of which are incorporated herein by reference.

FIELD

A certain aspect of the embodiments discussed herein is related to a method of monitoring video quality, a distribution server, and a client.

BACKGROUND

Recent years have seen developments in video distribution services with an increase in the speed of Internet access lines, the emergence of their optical version, and increases in the capacities of the backbones of carriers and Internet service providers (ISPs). ISPs and carriers regard video distribution services as services for differentiating themselves from others as well, and prepare contents with unique features to obtain users.

Further, coding techniques have made progress to allow video signals, which basically contain a large amount of information, to be compressed while maintaining their video quality, which may be considered as another factor in the increase in these video services. Standards such as MPEG-2, MPEG-4, and H.264 have made it possible to transmit video signals in a relatively low frequency band of several Mbps to tens of Mbps, which has enabled simultaneous distribution of video to multiple users.

Further, studies have been made of future IP redistribution of broadcast services that distributes present broadcast services of terrestrial digital broadcasting through IP networks. Thus, video services are expected to become one of basic network services in the future.

SUMMARY

According to an aspect of the invention, a video quality monitoring method includes a distribution server measuring a plurality of first video quality index values according to a full-reference method by comparing a video, distributed from the distribution server to a client through a network, with a degraded video, generated by causing a plurality of scenarios of quality degradation due to the network in the video in a pseudo manner; the distribution server creating characteristic data of a plurality of first quality degradation values, obtained by causing the quality degradation to vary with the scenarios at regular intervals, and the first video quality index values corresponding to the respective scenarios, and transmitting the characteristic data to the client; the client measuring a second quality degradation value in the video distributed through the network; and the client calculating a second video quality index value, equivalent to a value according to the full-reference method, of the distributed video from the measured second quality degradation value and the characteristic data.

According to an aspect of the invention, a distribution server configured to distribute a video to a client through a network includes a degraded video generation unit configured to generate a degraded video by causing a plurality of scenarios of quality degradation due to the network in the video in a pseudo manner; a video quality index value measurement unit configured to measure a plurality of first video quality index values according to a full-reference method by comparing the video with the degraded video; a characteristic data creation unit configured to create characteristic data of a plurality of first quality degradation values, obtained by causing the quality degradation to vary with the scenarios at regular intervals, and the first video quality index values corresponding to the respective scenarios; and a transmission unit configured to transmit the characteristic data to one of the client and a network management system connected to the network.

According to an aspect of the invention, a distribution server configured to distribute a video to a client through a network includes a degraded video generation unit configured to generate a degraded video by causing a plurality of scenarios of quality degradation due to the network in the video in a pseudo manner; a video quality index value measurement unit configured to measure a plurality of first video quality index values according to a full-reference method by comparing the video with the degraded video; a characteristic data creation unit configured to create characteristic data of a plurality of first quality degradation values, obtained by causing the quality degradation to vary with the scenarios at regular intervals, and the first video quality index values corresponding to the respective scenarios; and a video quality index value calculation unit configured to receive a second quality degradation value in the video measured and transmitted by the client, and to calculate a second video quality index value, equivalent to a value according to the full-reference method, of the distributed video from the received measured second quality degradation value and the characteristic data.

The object and advantages of the embodiments will be realized and attained by means of the elements and combinations particularly pointed out in the claims.

It is to be understood that both the foregoing general description and the following detailed description are exemplary and explanatory and not restrictive of the invention, as claimed.

BRIEF DESCRIPTION OF THE DRAWINGS

FIG. 19 is a diagram illustrating calculation of the video quality index value of distributed video in a video quality index calculation function unit according to the third embodiment.

DESCRIPTION OF EMBODIMENTS

Figure 1:
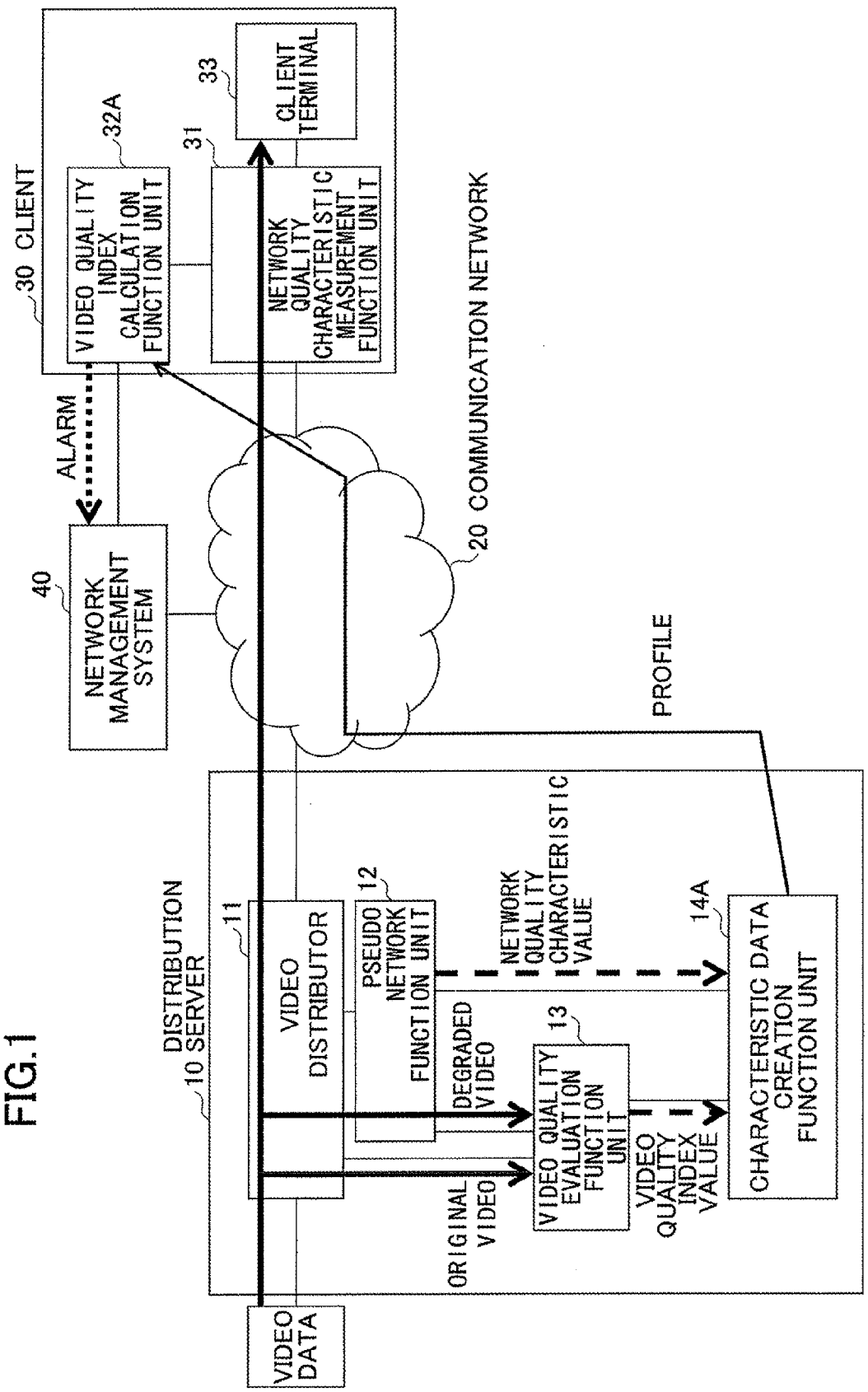
FIG. 1 is a diagram illustrating a basic operation of a video quality monitoring method according to a first embodiment.

However, the following problems are likely to occur in response to future full-scale implementation of network video distribution services such as Video on Demand (VOD) and Internet Protocol television (IPTV).

That is, the Internet currently does not guarantee packet transfer (transmission) quality such as a band and delay (that is, on best effort delivery), so that the occurrence of congestion or network equipment failure in the network affects video services and causes the degradation of their video quality. For example, the occurrence of a packet loss in the network due to a router failure causes block noise in the video reproduced on a screen on the user side, and may prevent the video from appearing on the screen in the worst case.

If such a problem occurs, a network operator and/or a video service provider is desired to immediately become aware of the occurrence of the failure in the video service and to subsequently restore the service by specifying the cause and solving the problem.

Further, in view of future IP redistribution of terrestrial digital broadcasting services, it is desirable for the network operator to constantly monitor video quality and determine whether the video quality is ensured in the case of providing broadcast services through the network, because the network is desired to satisfy as high a quality standard as broadcasting.

Conventionally, there are roughly two types of quality evaluation (assessment) methods for evaluating video quality: subjective quality evaluation and objective quality evaluation.

The subjective quality evaluation, which is for a man to evaluate the quality that she/he perceives, includes, for example, mean opinion score (MOS) value evaluation. According to this method, multiple users actually observe a video sample and numerically evaluate its video quality, and the evaluation results are averaged to serve as an evaluation index. Some specific subjective quality evaluation methods are defined in, for example, ITU-R BT.500-11. Typical examples of subjective quality evaluation methods include the double-stimulus continuous quality-scale (DSCQS) method.

On the other hand, the objective quality evaluation is not for a man but for a measuring apparatus to evaluate quality. For example, with respect to the evaluation of the audio quality of Voice over Internet Protocol (VoIP) or the like, objective evaluation indexes such as the R value (defined by ITU-T G.107) are well known. On the other hand, ITU-T J.144 defines the following three kinds of evaluation approaches as objective quality evaluation methods for video quality.

The full reference (FR) method evaluates the degree of video degradation by comparing degraded video (video subjected to quality degradation such as a packet loss through a network in the case of network video distribution services) and the original video.

The non reference (NR) method evaluates video using only degraded video without using original video. Since no original video is used, the problems of the FR method do not occur. However, no specific evaluation methods have been established yet.

The reduced reference (RR) method replaces the original video with its feature information for comparison with degraded video in the FR method.

Japanese Laid-open Patent Publication No. 2004-23115 discloses calculating transmission characteristic parameters at the time of a digital data sequence into which media information such as audio and video has been encoded passing through a communication channel; providing a pseudo communication channel having the transmission characteristics set by the transmission characteristic parameters; and reproducing the audio and video media information from the digital data sequence that has passed through the pseudo communication channel, thereby evaluating communication service quality after passage through the communication channel.

Japanese Laid-open Patent Publication No. 2005-229214 discloses a video service quality control method including performing a degradation pattern extraction operation to infer a degradation pattern from the conditions of a server, a network, and a terminal measured during a service with respect to the pre-determined subjective quality evaluation characteristics of the occurrence pattern of quality degradation; calculating the subjective evaluation value characteristics of the degradation pattern; and determining the degradation of the quality of the service based on the calculation result, wherein the quality degradation pattern is measured together with the calculation of the subjective evaluation value characteristics of the degradation pattern, and the quality degradation is determined by calculating long-term subjective evaluation values from the relationship between the obtained quality degradation pattern and the subjective evaluation values and from the long-term variation characteristics of the subjective evaluation values.

If the FR method is to be applied to network video distribution services, naturally, an evaluation apparatus is to be installed near a video receiver, that is, on the side of a user who receives video services because the degraded video that has passed through the network is to be compared with its original (original video). Further, the original video to be compared with the degraded video is also to be retained on the user side.

This situation is accompanied by the following difficulties. That is, generally, a dedicated hardware item is used as a concrete evaluation apparatus according to the FR method. Examples of apparatuses for evaluating the MOS value, which is a video quality index, according to the FR method include VP21H manufactured by K-WILL Corporation. This apparatus calculates the MOS value in real time in response to the inputting of an original image and a degraded image. However, it is costly and impractical to provide each video service receiving user with such a hardware apparatus.

Further, in order to retain the original video on the user side, it is necessary to provide an apparatus for retaining the original video (a storage device) on the user side or to deliver the original video in advance to the user using a network provided separately from the video distribution network and causing no degradation of quality, which is also costly and impractical. Therefore, there is a problem in that it is not practical to monitor video quality degradation according to the FR method.

One NR method technique that is currently under development is an MDI (Media Delivery Index, RFC4445) measurement, which calculates a video quality evaluation index value from a packet loss rate in the network without using the original video. However, there is a problem in that the MDI has low reliability as a video quality index value; that is, the correlation between the MDI and the MOS value, which is a subjective quality index, is low so as to prevent accurate evaluation.

Compared with the FR method, the RR method may retain information smaller in amount than the original video information conventionally used. However, the RR method requires an evaluation apparatus to be provided on the user side, and does not substantially solve problems of the FR method.

To sum up, no video quality evaluation method has been established that performs accurate evaluation quickly at low cost. It is desirable to solve this problem in order to monitor video quality and detect its degradation in network video distribution services to be fully implemented in the future.

According to one aspect of the invention, a video quality monitoring method, a distribution server, and a client are provided that allow the quality of the video viewed by a user in a network video distribution service to be evaluated quickly at low cost.

Preferred embodiments of the present invention will be explained with reference to accompanying drawings.

According to one aspect of the invention, video quality evaluation is performed that is a combination of an FR method and an NR method. Further, as a basic approach, a video quality evaluation method calculates the video quality index value at the time of certain network quality characteristics by correlating the measurements (measured values) of network characteristics (such as packet loss and delay) and the actual measurement (measured value) of the video quality evaluation index.

[a] First Embodiment

FIG. 1 is a diagram illustrating a basic operation of a video quality monitoring method according to a first embodiment. Referring to FIG. 1, a distribution server 10 includes a video distributor 11 that distributes video, a pseudo network function unit 12 that emulates a network for actually distributing the video, a video quality evaluation function unit 13 that evaluates video quality, and a characteristic data creation function unit 14A.

The video distributor 11 is supplied with video data fed from a video storage device or a camera, and converts the video data into video traffic. The video distributor 11 transmits the video traffic to a communication network 20 and at the same time feeds the video traffic to the pseudo network function unit 12 and the video quality evaluation function unit 13.

The pseudo network function unit 12 emulates a scenario of actual quality degradation by the communication network 20. The pseudo network function unit 12 periodically varies the packet loss rate and delay at regular intervals, and supplies the video traffic degraded here by packet loss to the video quality evaluation function unit 13. Further, the pseudo network function unit 12 supplies network quality characteristic values such as a packet loss rate to the characteristic data creation function unit 14A.

The degraded video traffic output by the pseudo network function unit 12 may be supplied to a network quality characteristic measurement function unit (having the same configuration as a network quality characteristic measurement function unit 31 described below) (not graphically illustrated), where network quality characteristic values such as a packet loss rate are measured to be supplied to the characteristic data creation function unit 14A.

The video quality evaluation function unit 13 evaluates video quality, according to the FR method, from (based on) a video signal (reference video) obtained from the video traffic supplied from the video distributor 11 and a video signal (degraded video) obtained from the video traffic degraded by a packet loss rate and delay in the pseudo network function unit 12, thereby measuring a video quality evaluation index value at regular intervals, and supplies the measured video quality evaluation index value to the characteristic data creation function unit 14A.

The characteristic data creation function unit 14A creates a profile that is data on the correspondence between the network quality characteristic values and the video quality evaluation index value on a regular interval basis, and transmits the created profile to a video quality index calculation function unit 32A of one or more clients 30 (only one of which is illustrated in FIG. 1 by way of example) through the communication network 20.

The client 30 includes the network quality characteristic measurement function unit 31, the video quality index calculation function unit 32A, and a client terminal 33. The client 30 evaluates the quality of video received by a user based on the NR method. That is, the client 30 does not use original video but uses only degraded video for evaluation of video quality.

The network quality characteristic measurement function unit 31 measures a packet loss rate, which is an actual network quality characteristic value, of the video traffic received from the distribution server 10 through the communication network 20, and transmits the measured value to the video quality index calculation function unit 32A. Further, the network quality characteristic measurement function unit 31 supplies the client terminal 33 with the received video traffic.

The video quality index calculation function unit 32A calculates a video quality index value according to the FR method on the client side at that point from the measured network quality characteristic value and the profile transmitted from the characteristic data creation function unit 14A of the distribution server 10. Further, the video quality index calculation function unit 32A has a threshold for determining whether the video quality has degraded with respect to the calculated video quality index value. If the calculated video quality index value exceeds the threshold, the video quality index calculation function unit 32A determines that the quality of the video that is being viewed by a user has degraded, and transmits alarm information to a network management system 40 such as an NMS (network management system) managed by a network operator.

With the above-described process, it is possible to calculate a video quality evaluation index value with accuracy based on the network quality characteristic values measured in the client 30, and to immediately notify the network management system 40 of the degradation of video quality.

Here, the distribution server 10 creates a profile at regular intervals and transmits the created profile to the video quality index calculation function unit 32A of the client 30 for the following reason.

The video quality perceived by a user (perceived quality) with respect to a certain packet loss differs depending on the kind of a content or a scene of video. For example, with respect to an MPEG-2-encoded video, a scene that takes up the entire screen with a large object of the same color and a scene where multiple objects of various colors are disposed are compared. It is assumed that a packet loss occurs to cause block noise. In the former scene, the block noise blends with a background of the same color and does not stand out so much. Therefore, the perceived quality is not so poor. On the other hand, in the latter scene, the block noise is seen superposed on objects of various colors, so that the quality is perceived to be poor.

That is, the profile (the relationship between network quality characteristic values such as a packet loss rate and a video quality index value), created in a certain time period during the playback (reproduction) of video by the distribution server 10, varies because of a difference between scenes, time periods, or contents.

Therefore, according to this embodiment, a profile is created at regular intervals on the distribution server 10 side, and is transmitted to the client 30 side every time the profile is created, thereby making it possible to follow variations in video characteristics. On the client 30 side, it is possible to accurately evaluate a scene that is being viewed by a user on the client terminal 33 by evaluating video quality using the (updated) profile transmitted at regular intervals, which is always the latest.

In the above-described basic operation, the profile generated at regular intervals in the distribution server 10 is transmitted to the client 30, and the client 30 calculates a video quality index value using actually measured network quality characteristic values such as a packet loss rate and the profile. It is not always necessary, however, to calculate the video quality index value in the client 30.

[b] Second Embodiment

Figure 2:
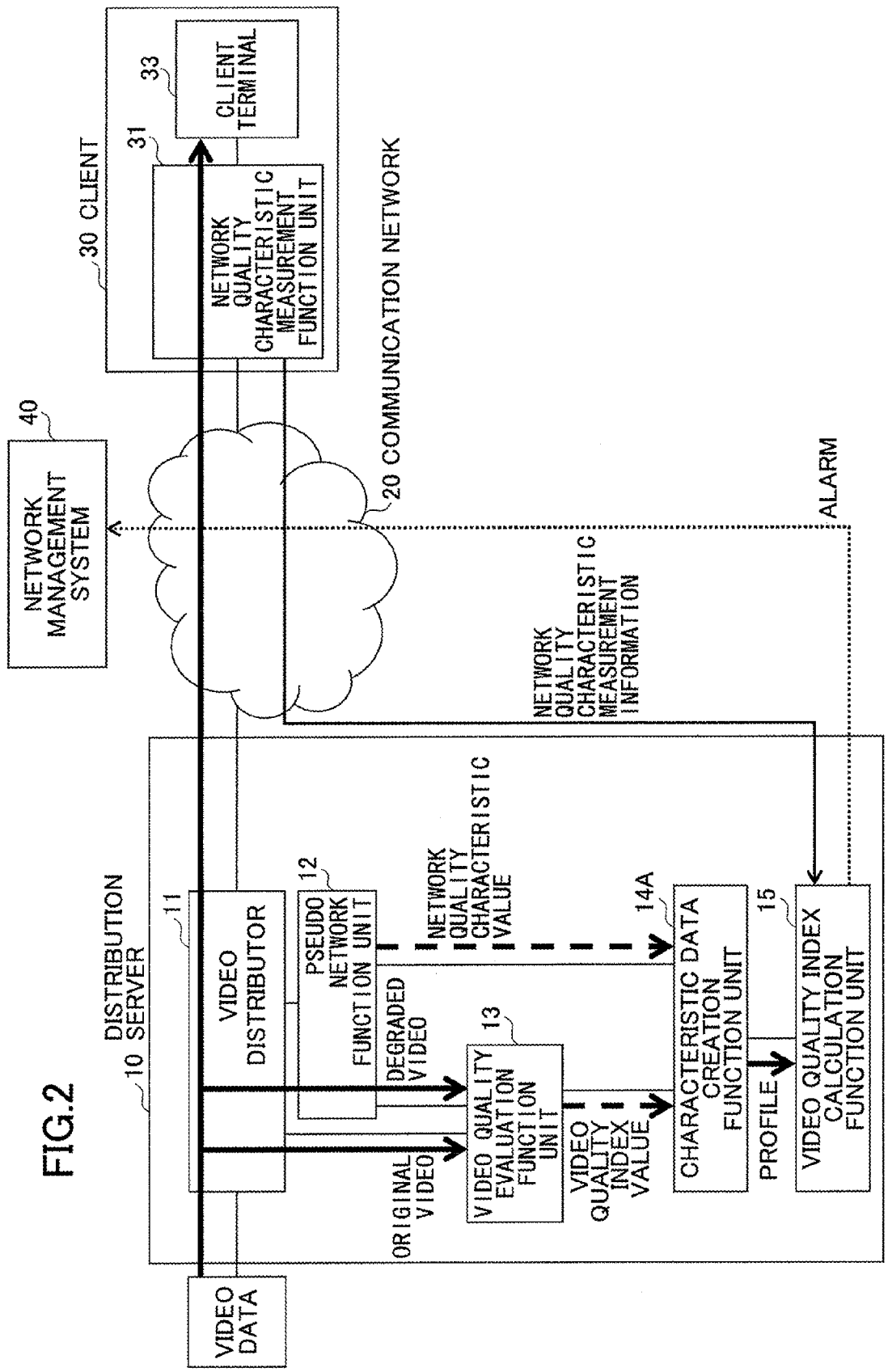
FIG. 2 is a diagram illustrating a basic operation of a video quality monitoring method according to a second embodiment.

FIG. 2 is a diagram illustrating a basic operation of a video quality monitoring method according to a second embodiment. According to this embodiment, the profile information created by the characteristic data creating function unit 14A of the distribution server 10 is not transmitted to the client 30, and one or more network quality characteristic values measured by the network quality characteristic measurement unit 31 of the client 30 are transmitted to the distribution server 10 at regular intervals, so that a video quality index calculation function unit 15 provided in the distribution server 10 calculates the video quality index value of the client 30 at regular intervals.

Therefore, while the video quality index calculation function unit 32A, which receives profile information and calculates a video quality index value from measured network quality characteristic values, is provided in the client 30 in FIG. 1, the video quality index calculation function unit 15 is provided subsequently to the characteristic data creating function unit 14A of the distribution server 10 in FIG. 2.

The client 30 (or each client 30) transmits the network quality characteristic values measured in the network quality characteristic measurement function unit 31 to the video quality index calculation unit 15 of the distribution server 10 at regular intervals.

The video quality index calculation function unit 15 calculates a video quality index value at that point based on the profile information received at regular intervals from the characteristic data creation function unit 14A and the received network quality characteristic values.

Further, the video quality index calculation function unit 15 has a threshold for determining whether the video quality has degraded with respect to the calculated video quality index value. If the calculated video quality index value exceeds the threshold, the video quality index calculation function unit 15 determines that the quality of the video that is being viewed by a user has degraded, and transmits alarm information to the network management system 40 such as an NMS managed by a network operator.

The first embodiment and the second embodiment may be combined to allow each of the distribution server 10 and the client 30 to calculate a video quality index value.

Alternatively, the video quality index calculation function unit 15 may be provided in the network management system 40. In this case, the profile information created in the characteristic data creation function unit 14A of the distribution server may be transmitted to the network management system 40 at regular intervals, and one or more network quality characteristic values measured in the network quality characteristic measurement function unit 31 of the client 30 may be transmitted to the network management system 40 at regular intervals, so that the video quality index calculation function unit 15 provided in the network management system 40 may determine the degradation of video quality.

Next, a description is given of advance distribution of profile information.

In the above-described first and second embodiments, the distribution server 10 creates a profile and distributes the profile to the clients 30 at the same time as actual video distribution to users. In the case of live distribution or live broadcasting, it is desirable to create a profile at the same time as the distribution of video. In the case of distributing a content whose contents are known in advance, such as a movie or drama, a profile may be created in advance for the content to be distributed, and the created profile may be provided to the video quality index calculation function unit 15 or 32A before distribution of the content.

Next, a description is given in more detail of the distribution server 10 and the client 30 in the first and second embodiments.

Figure 3:
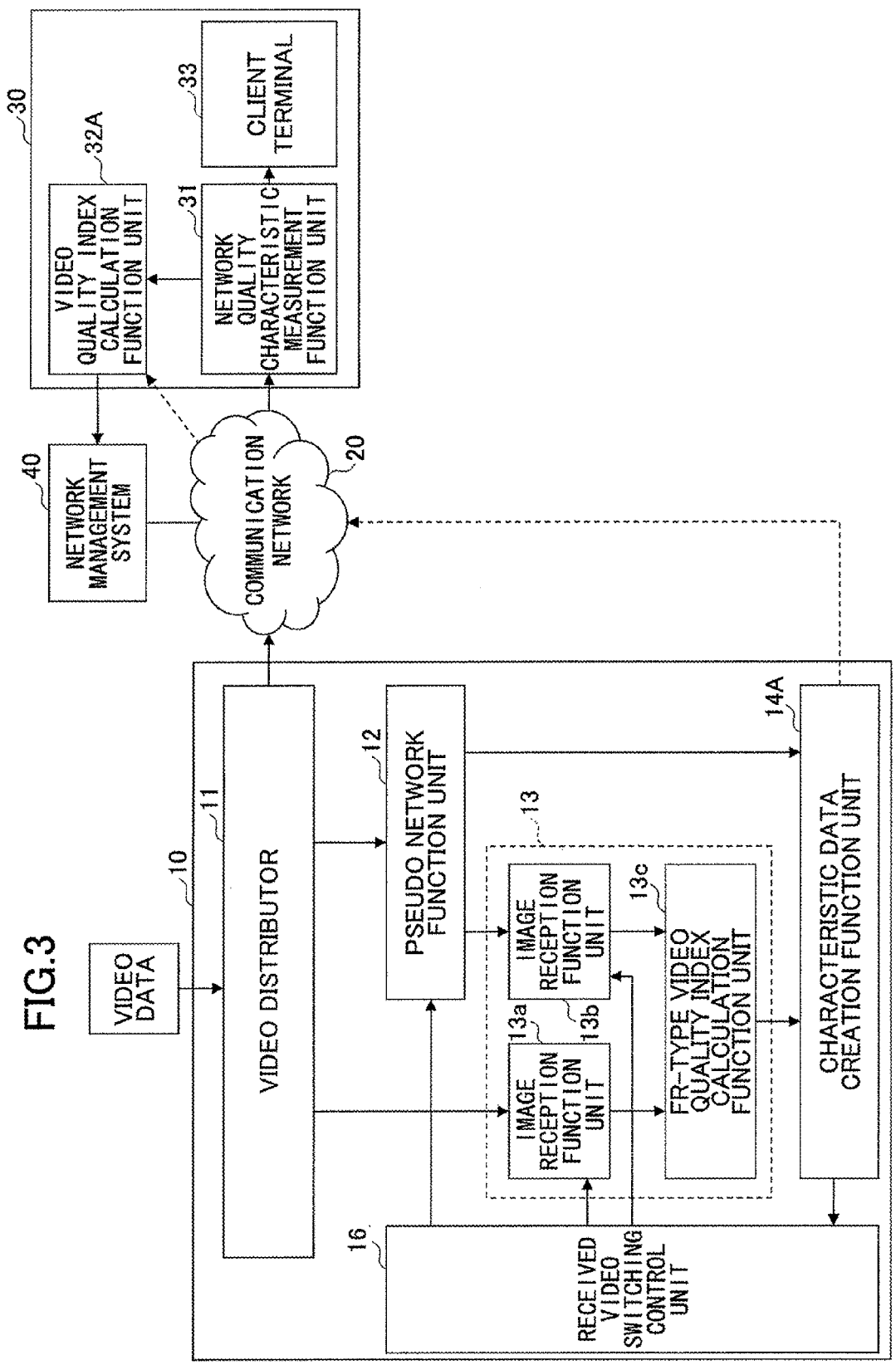
FIG. 3 is a detailed block diagram illustrating a distribution server and a client according to the first and second embodiments.

FIG. 3 is a detailed block diagram illustrating the distribution server 10 and the client 30 in the first and second embodiments. FIG. 3 is based on the video quality monitoring method of FIG. 1 according to the first embodiment.

Referring to FIG. 3, the video quality evaluation function unit 13 of the distribution server 10 includes an image reception function unit 13a, an image reception function unit 13b, and an FR-type video quality index calculation function unit 13c.

The image reception function units 13a and 13b convert the video traffic supplied from the video distributor 11 and the video traffic supplied from the pseudo network function unit 12, respectively, into video signals. For example, the image reception function units 13*a* and 13*b* are implemented by a personal computer (PC) or the like, and output video reproduced with video playback software on the PC, such as Windows Media Player or a VLC media player, as analog or digital video signals.

Figure 4:
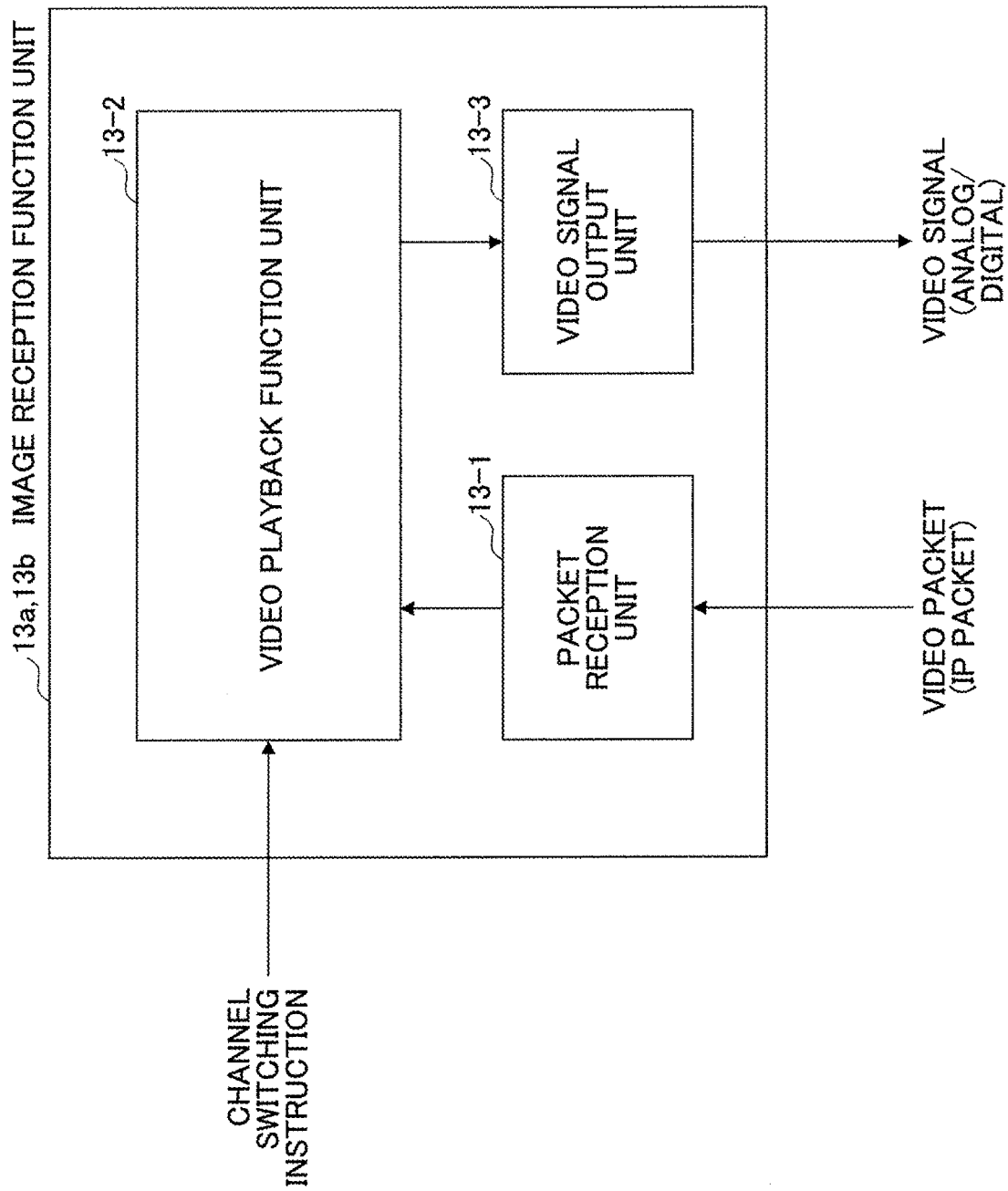
FIG. 4 is a functional diagram illustrating a configuration of an image reception function unit according to the first and second embodiments.

FIG. 4 is a functional diagram illustrating a configuration of the image reception function unit 13*a*. The image reception function unit 13*b* may have the same configuration as the image reception function unit 13*a*. Referring to FIG. 4, the image reception function unit 13*a* (13*b*) includes a packet reception unit 13-1, a video playback function unit 13-2, and a video signal output unit 13-3. The packet reception unit 13-1 is a network interface. Video packets (IP packets), which are video traffic received by the packet reception unit 13-1, are reproduced by video playback software serving as the video playback function unit 13-2, and are converted into and output as a video signal by the video signal output unit 13-3 serving as a video processing function inside the PC.

The video signal for original video generated in the image reception function unit 13*a* (reference video) and the video signal for degraded video generated in the image reception function unit 13*b* (degraded video) are supplied to the FR-type video quality index calculation function unit 13*c*.

As the FR-type video quality index calculation function unit 13*c*, VP21H manufactured by K-WILL Corporation, which is a hardware-type video quality evaluation apparatus, may be used, for example. The FR-type video quality index calculation function unit 13*c* outputs, from (based on) the reference video and the degraded video, a video quality index corresponding to a DSCQS value, which is a subjective evaluation index, as a video quality index value according to the FR method.

If the video signals output by the image reception function units 13*a* and 13*b* and video signals receivable by the FR-type video quality index calculation function unit 13*c* are different in format, a video signal converter (such as a scan converter) may be used.

Next, in the pseudo network function unit 12, a dedicated appliance for varying one or more network quality characteristics in a pseudo manner, for example, for causing a packet loss or delay, may be used. For example, with respect to the packet loss rate, such an appliance has a function of discarding passing IP packets at a specified packet loss rate during a specified period. The pseudo network function unit 12 periodically discards passing IP packet at N kinds of different packet loss rates Ln at regular intervals Tp in order to emulate scenarios of network quality degradation. The specific values of the regular interval Tp, the number of kinds of packet loss values N (an integer greater than one), and the packet loss rates Ln may be determined as network quality scenarios from an external apparatus such as a PC, for example. Alternatively, the network quality scenarios may be specified by internal configuration files. Further, the packet loss rates Ln may be specified (determined) in ascending order, in descending order, or at random.

The characteristic data creation function unit 14A creates a profile by mapping the relationship between the video quality index values (DSCQS values) measured in the FR-type video quality index calculation unit 13*c* and the packet loss rates given in the pseudo network function unit 12.

Figure 5:
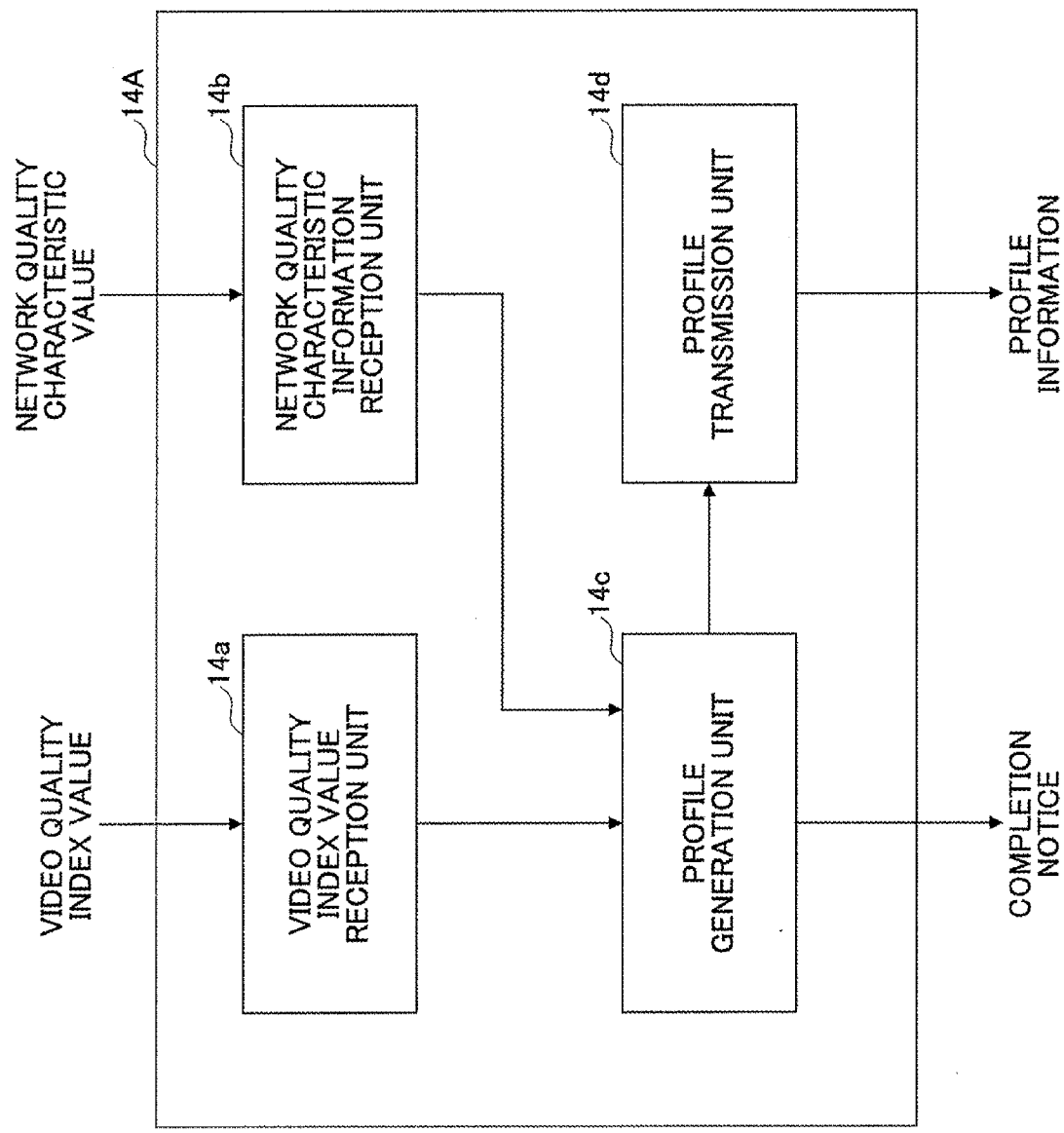
FIG. 5 is a block diagram illustrating a functional configuration of a characteristic data creation function unit according to the first and second embodiments.

FIG. 5 is a block diagram illustrating a functional configuration of the characteristic data creation function unit 14A. Referring to FIG. 5, the characteristic data creation function unit 14A includes a video quality index value reception unit 14*a*, a network quality characteristic information reception unit 14*b*, a profile generation unit 14*c*, and a profile transmission unit 14*d*.

The video quality index value reception unit 14*a* receives video quality index values (DSCQS values) supplied from the FR-type video quality index calculation function unit 13*c* at regular intervals. Then, the video quality index value reception unit 14*a* transmits the received video quality index values directly to the profile generation unit 14*c*, or averages the received video quality index values at predetermined regular intervals and transmits the average of the video quality index values to the profile generation unit 14*c*.

The network quality characteristic information reception unit 14*b* receives the values of the specified packet loss rates from the pseudo network function unit 12 (FIG. 3), and transmits the received values to the profile generation unit 14*c*.

The profile generation unit 14*c* generates a profile by correlating the DSCQS values and the corresponding packet loss rates transmitted from the video quality index value reception unit 14*a* and the network quality characteristic information reception unit 14*b*, respectively, for a certain period.

The profile generated in the profile generation unit 14*c* is supplied to the profile transmission unit 14*d*. The profile transmission unit 14*d* transmits the supplied profile information to the video quality index calculation function unit 32A of the client 30 through the communication network 20 (FIG. 3).

The profile transmission unit 14*d* may retain the profile information as a single file and transmit the profile information to the video quality index calculation function unit 32A of the client 30 by FTP (File Transfer Protocol). Alternatively, the profile transmission unit 14*d* may transmit the profile information to a particular multicast address, and the video quality index calculation function unit 32A of the client 30 may receive the profile information by being configured to receive from the multicast address. Further, the profile generation unit 14*c* notifies a received video switching control unit 16 (FIG. 3) of the distribution server 10 of completion of the generation of the profile at the same time that the profile generation unit 14*c* transmits the generated profile to the profile transmission unit 14*d*.

According to one aspect of the present invention, the received video whose video quality is to be evaluated may be switched so that the quality of other video may be evaluated. Therefore, in response to reception of a profile generation completion notification from the profile generation unit 14*c*, the received video switching control unit 16 instructs the image reception function units 13*a* and 13*b* (FIG. 3) to switch the received video to another one. This instruction is given by, for example, indicating the reception address of the other video to the image reception function units 13*a* and 13*b*. Specifically, for example, if the distribution server 10 distributes video by multicast, the video to be received may be specified by specifying a multicast group (multicast address) to be received.

The received video switching control unit 16 may switch video to be received by, for example, prestoring the multicast addresses of videos to be subjected to video quality evaluation as a configuration file and specifying a multicast address in accordance with the configuration file in response to reception of a profile generation completion notification from the profile generation unit 14*c*. The received video switching control unit 16 may be implemented with an apparatus such as a PC or implemented in the same apparatus as the characteristic data creation function unit 14A.

Next, a description is given of evaluation of the quality of received video in the client 30. As illustrated in FIG. 3, for example, in the client 30, the network quality characteristic measurement function unit 31 precedes the client terminal 33, and measures one or more network quality characteristic values of video traffic that is being received.

Figure 6:
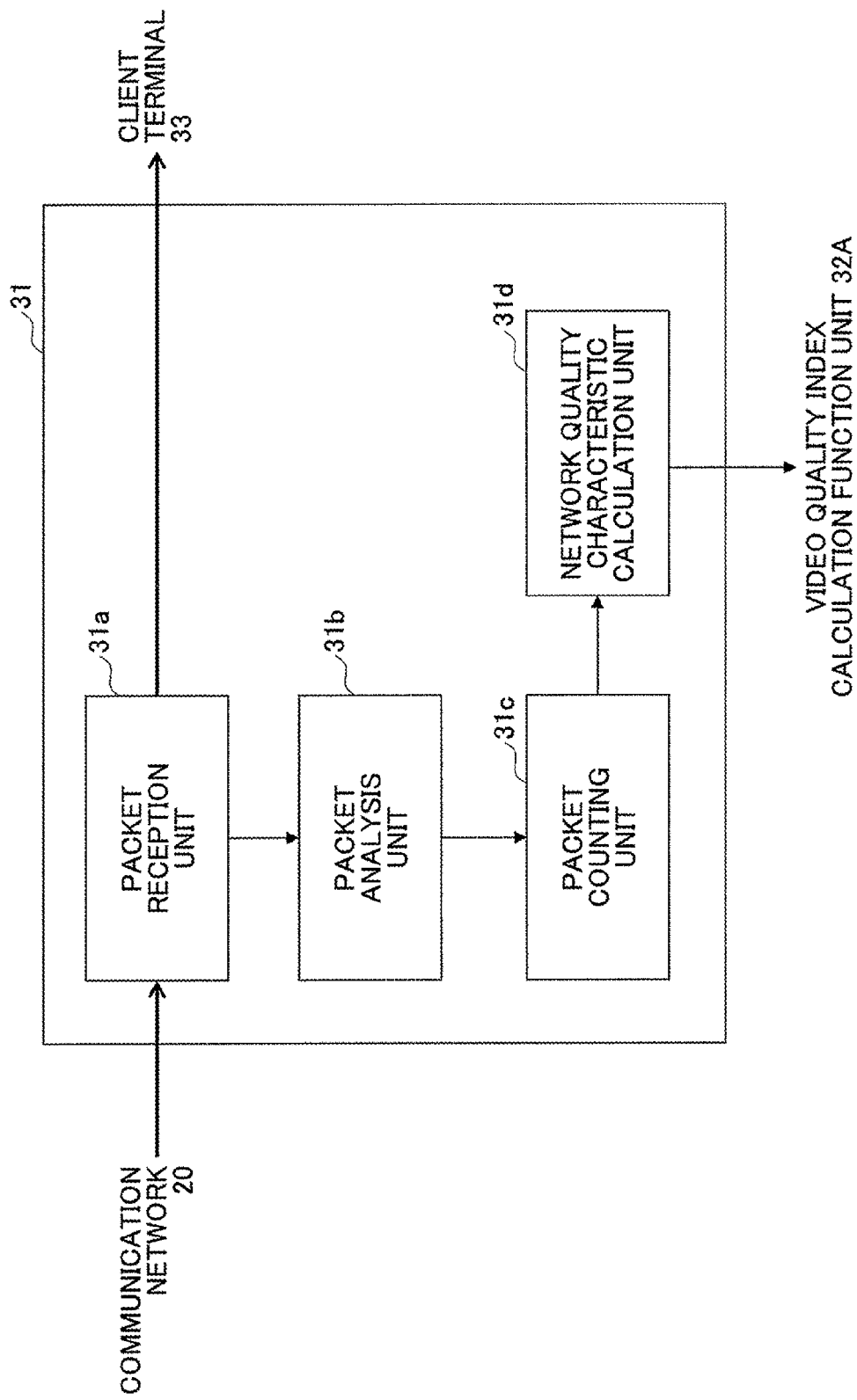
FIG. 6 is a block diagram illustrating a functional configuration of a network quality characteristic measurement function unit according to the first and second embodiments.
Figure 7:
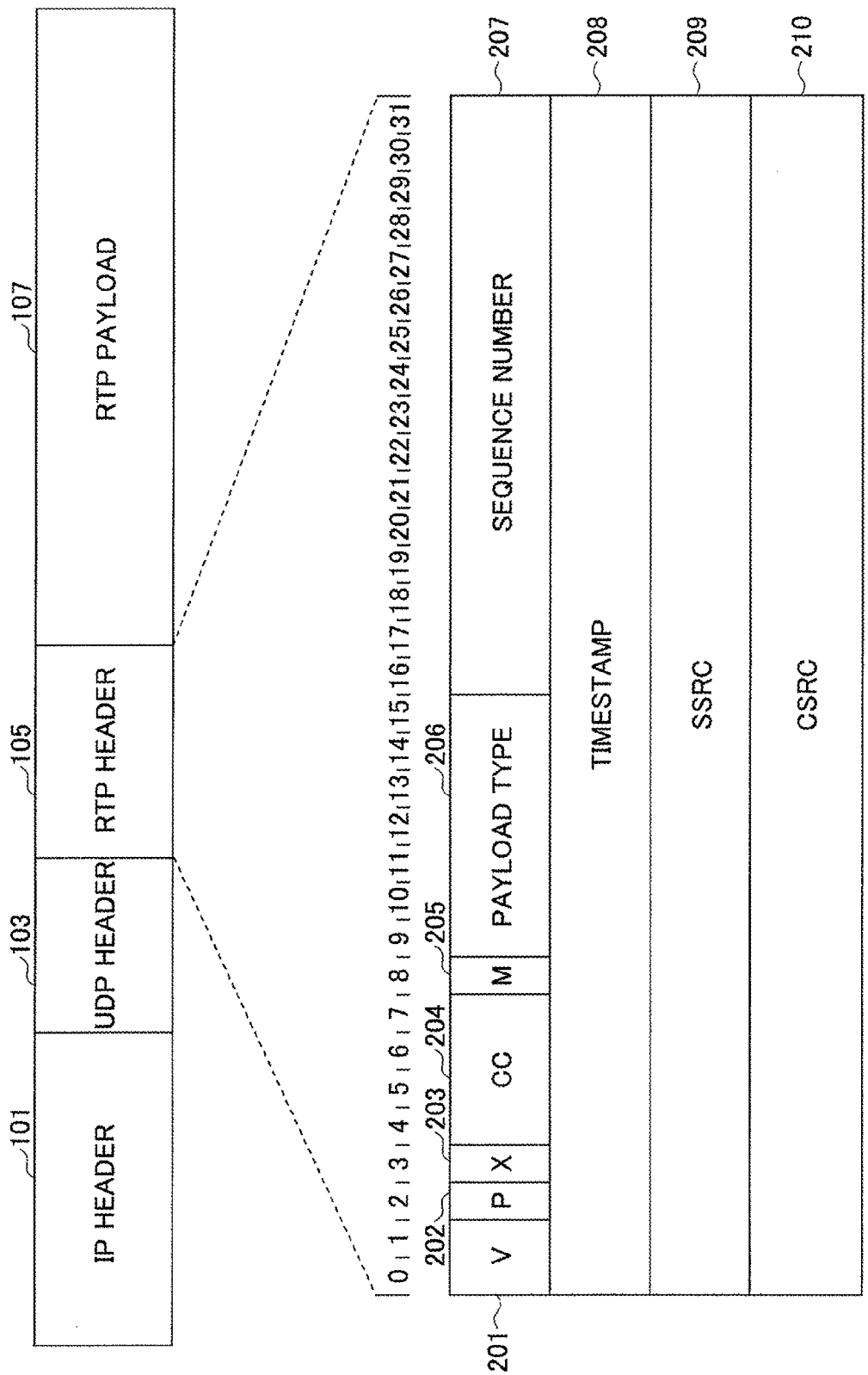
FIG. 7 is a diagram illustrating an RTP packet format according to the first and second embodiments.

FIG. 6 is a block diagram illustrating a functional configuration of the network quality characteristic measurement function unit 31. The network quality characteristic measurement function unit 31 measures (detects), for example, packet loss. For example, a video stream is often distributed using RTP (Real-time Transport Protocol). Therefore, the discarding of an RTP packet in the middle of a network may be determined by observing an interruption of the sequence numbers of RTP packet headers. FIG. 7 illustrates an RTP packet format. A packet of a video stream includes an IP (Internet Protocol) header 101, a UDP (User Datagram Protocol) header 103, an RTP header 105, and an RTP payload 107 for storing video information. The RTP header 105 includes the following fields: V (Version) 201, P (Padding) 202, X (Extension) 203, CC (CSRC [Contributing Source] Count) 204, M (Marker) 205, PT (Payload Type) 206, Sequence Number 207, Timestamp 208, SSRC (Synchronization Source) 209 (uniquely identifying the source of a stream), and CSRC 210 (identifying contributing sources to a stream). The sequence number is incremented by one for each RTP packet transmitted.

Referring back to FIG. 6, the network quality characteristic measurement function unit 31 includes a packet reception unit 31a, a packet analysis unit 31b, a packet counting unit 31c, and a network quality characteristic calculation unit 31d.

The packet reception unit 31a receives a packet from the communication network 20 (FIG. 3), and supplies the received packet to the client terminal 33. The packet reception unit 31a also supplies the header of the received packet to the packet analysis unit 31b.

The packet analysis unit 31b analyzes the packet header, and determines whether there is a lost or missing packet in RTP packet sequence. The packet analysis unit 31b notifies the packet counting unit 31c of the determination result. The packet counting unit 31c counts the number of lost or missing packets (packets not received) in RTP packet sequence (the number of lost packets A) and the number of received packets B for each pre-specified measurement period, and notifies the network quality characteristic calculation unit 31d of the number of lost packets A and the number of received packets B counted.

The network quality characteristic calculation unit 31d calculates a packet loss rate (%) for each pre-specified measurement period by dividing the number of lost packets A by the sum of the number of lost packets A and the number of received packets B (A/(A+B)), and notifies the video quality index calculation function unit 32A (FIG. 3) of the calculated packet loss rate (%).

Figure 8:
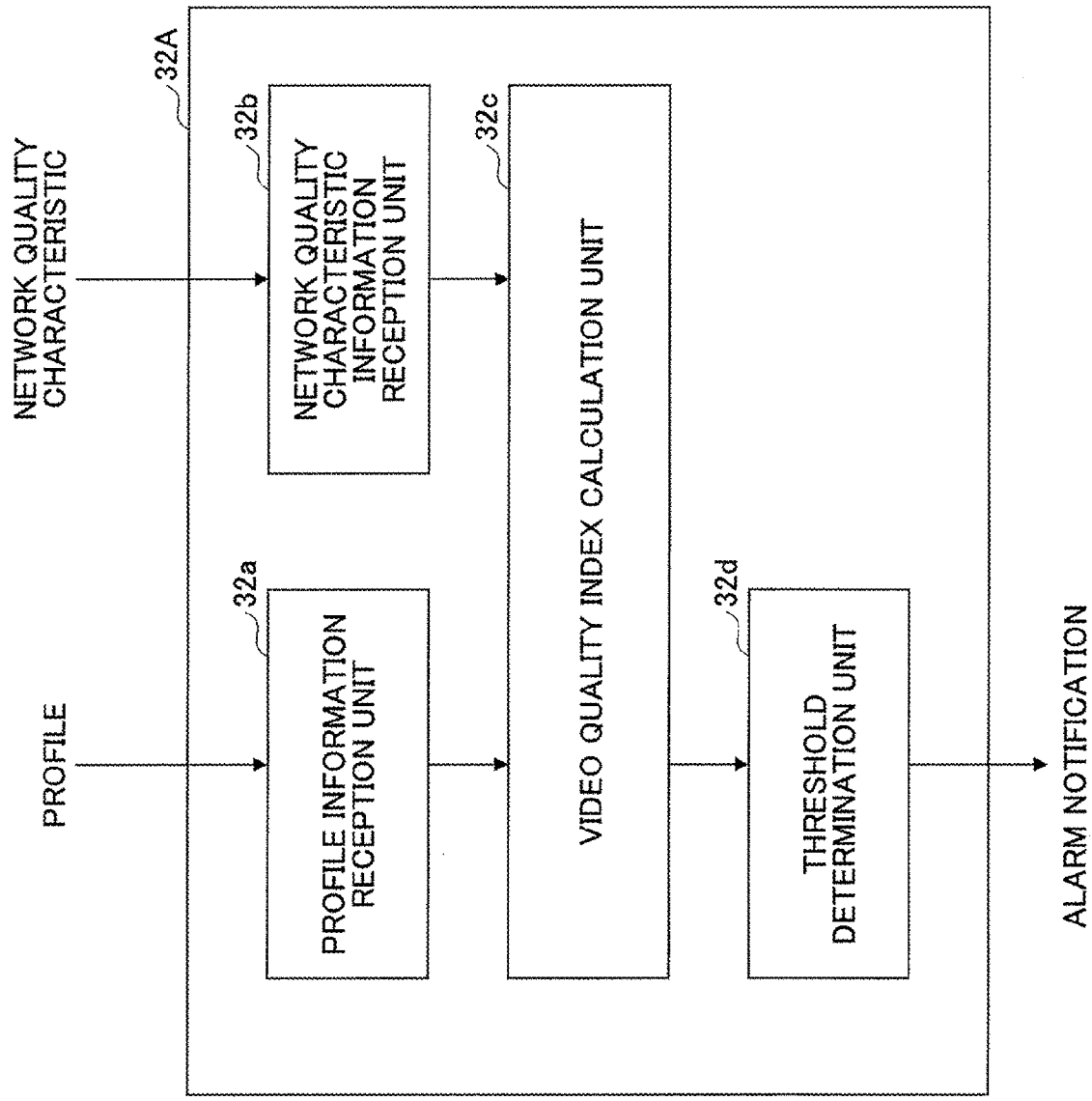
FIG. 8 is a block diagram illustrating a functional configuration of a video quality index calculation function unit according to the first and second embodiments.

FIG. 8 is a block diagram illustrating a functional configuration of the video quality index calculation function unit 32A. The video quality index calculation function unit 32A includes a profile information reception unit 32a, a network quality characteristic information reception unit 32b, a video quality index calculation unit 32c, and a threshold determination unit 32d.

The profile information reception unit 32a receives a profile from the characteristic data creation function unit 14A of the distribution server 10 (FIG. 3) at regular intervals, and updates the profile to constantly retain the latest profile information. Further, the network quality characteristic information reception unit 32b receives a packet loss rate from the network quality characteristic calculation unit 31d of the network quality characteristic measurement function unit 31 (FIG. 6) at regular intervals.

The video quality index calculation unit 32c calculates a video quality index value corresponding to the measured packet loss rate based on the relationship between the packet loss rate and the video quality index value of the profile. This video quality index value is equivalent to an FR-method value obtained by the FR-method. The video quality index calculation unit 32c transmits the calculated FR-method video quality index value to the threshold determination unit 32d.

The threshold determination unit 32d determines whether the video quality index value exceeds a predetermined threshold. If the video quality index value exceeds the threshold, the threshold determination unit 32d alerts the network management system 40 (FIG. 3). The network management system 40 may be alerted by the threshold determination unit 32d generating an alarm notification message and transmitting the alarm notification message to the network management system 40 through the communication network 20.

Thus, since NR method-based video quality evaluation is performed in the client 30, there is no need to retain original video or install a storage unit for retaining original video in the client 30. Further, there is no need to install such an expensive hardware-based video evaluation apparatus as is employed in the FR method in each of the clients 30. On the other hand, an expensive hardware-based video evaluation apparatus based on the FR method may be installed in the distribution server 10 only. Accordingly, it is possible to implement a video quality monitoring system including the distribution server 10 and the multiple clients 30 (for example, FIG. 1 and FIG. 2) at low cost.

Further, according to one embodiment, the distribution server 10 generates an accurate evaluation as a profile based on the FR-method, and the client 30 calculates a video quality index value using the profile. This makes it possible to evaluate video quality with accuracy.

[c] Third Embodiment

A description is given of a distribution server and a client according to a third embodiment.

Figure 9:
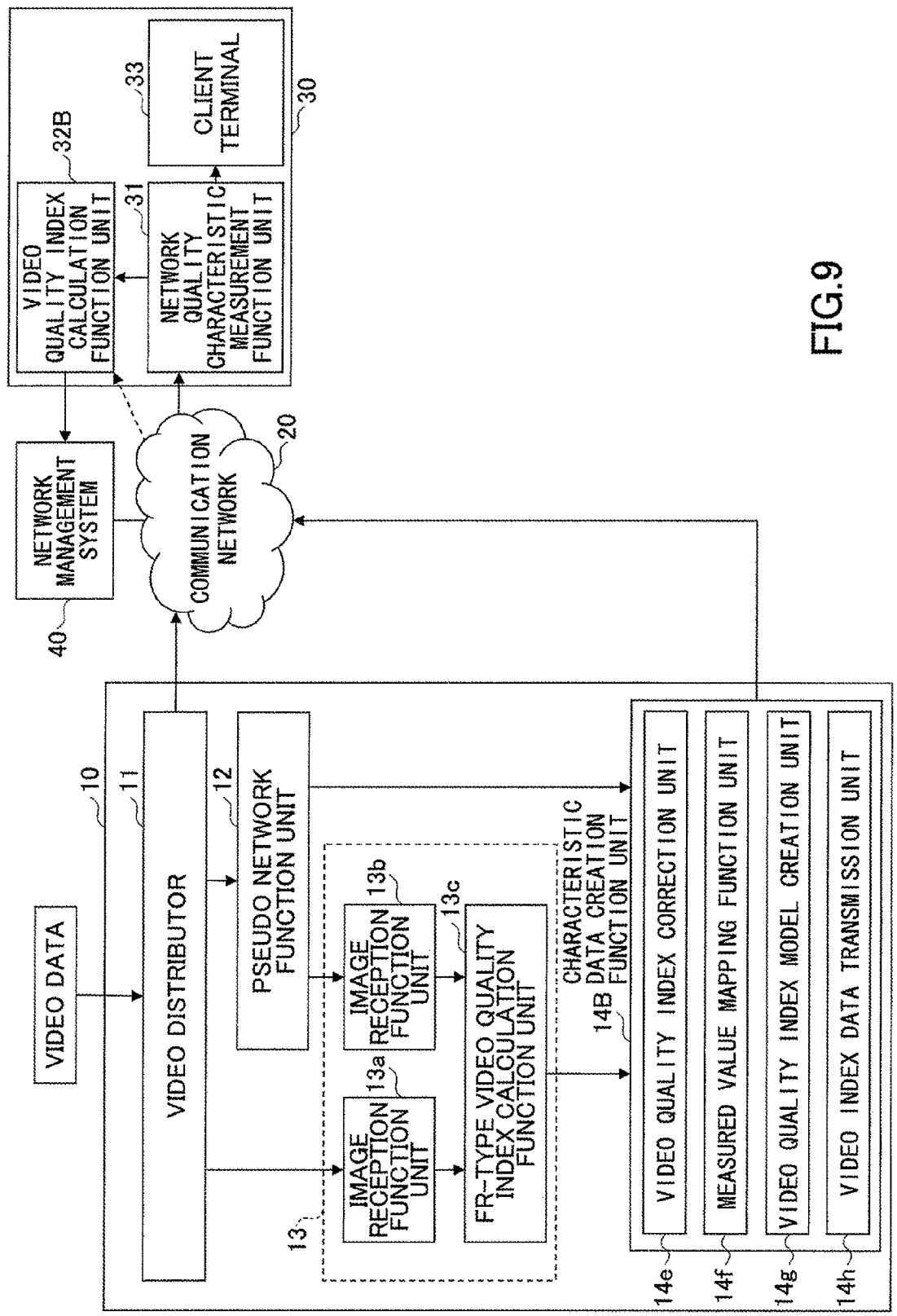
FIG. 9 is a block diagram illustrating the distribution server and the client according to a third embodiment.

FIG. 9 is a block diagram illustrating the distribution server 10 and the client 30 according to the third embodiment. In FIG. 9, the same elements as those illustrated in FIG. 1 through FIG. 3 are referred to by the same reference numerals.

Referring to FIG. 9, the distribution server 10 includes the video distributor 11, the pseudo network function unit 12 that emulates a network for actually distributing the video, the video quality evaluation function unit 13 that evaluates video quality, and a characteristic data creation function unit 14B.

The video distributor 11 is supplied with video data fed from a video storage device or a camera, and converts the video data into video traffic. The video distributor 11 transmits the video traffic to the communication network 20 and at the same time feeds the video traffic to the pseudo network function unit 12 and the video quality evaluation function unit 13.

The pseudo network function unit 12 emulates the actual communication network 20 to periodically vary the packet loss rate and delay at regular intervals and supply the video traffic degraded here by packet loss to the video quality evaluation function unit 13. Further, the pseudo network function unit 12 supplies network quality characteristic values such as a packet loss rate to the characteristic data creation function unit 14B.

The video quality evaluation function unit 13 includes the image reception function unit 13a, the image reception function unit 13b, and the FR-type video quality index calculation function unit 13c.

The image reception function units 13a and 13b convert the video traffic supplied from the video distributor 11 and the video traffic supplied from the pseudo network function unit 12, respectively, into video signals. For example, the image reception function units 13a and 13b are implemented by a personal computer (PC) or the like, and output video reproduced with video playback software on the PC, such as Windows Media Player or a VLC media player, as analog or digital video signals.

As the FR-type video quality index calculation function unit 13c, VP21H manufactured by K-WILL Corporation, which is a hardware-type video quality evaluation apparatus, may be used, for example. The FR-type video quality index calculation function unit 13c outputs, from (based on) the reference video and the degraded video, a video quality index corresponding to a DSCQS value, which is a subjective evaluation index, as a video quality index value according to the FR method.

The characteristic data creation function unit 14B includes a video quality index value correction unit 14e, a measured value mapping function unit 14f, a video quality index model creation unit 14g, and a video index data transmission unit 14h.

The video quality index value correction unit 14e estimates the amount of impact of a video quality index value caused by the asynchronism phenomenon of the reference video and the degraded video output by the image reception function units 13a and 13b, respectively, and corrects the video quality index value by removing the estimated amount of impact from the video quality index value.

The measured value mapping function unit 14f creates a profile by mapping the relationship between the video quality index value (DSCQS value) corrected by the video quality index value correction unit 14e and the packet loss rate output by the pseudo network function unit 12 with respect to the video received from the video distributor 11.

The video quality index model creation unit 14g creates a video quality index model by approximating the tendency of the profile, which is data on the correspondence between the packet loss rate of a network quality scenario and a video quality index value (DSCQS value) obtained in correspondence to the packet loss rate, to a function.

The video index data transmission unit 14h transmits the generated (created) video quality index model to the network quality characteristic measurement function unit 31 of the client 30 in response to the completion of processing the distributed video by the video quality index model creation unit 14g.

Figure 10:
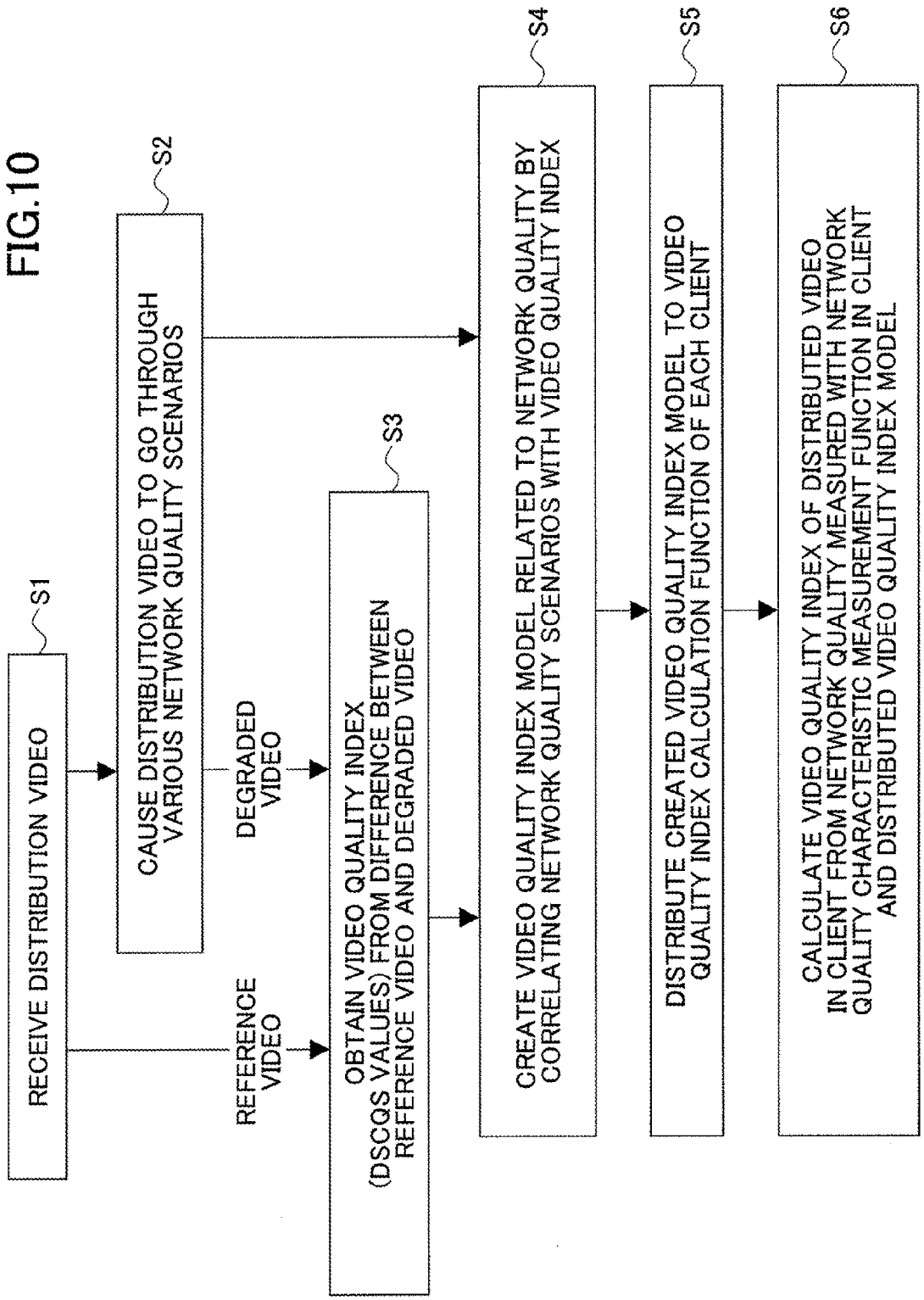
FIG. 10 is a diagram illustrating a basic flow of processing by the distribution server and the clients according to the third embodiment.

FIG. 10 is a diagram illustrating a basic flow of processing by the distribution server 10 and the clients 30. In FIG. 10, the multiple clients 30 may be collectively referred to in a singular form, that is, as "the client 30," for convenience of description.

In step S1, the video distributor 11 receives a distribution video to be distributed to the client 30.

In step S2, the pseudo network function unit 12 causes the distribution video to go through various scenarios of network quality degradation such as packet loss degradation.

In step S3, the characteristic data creation function unit 14B compares the distribution video received directly by the video quality evaluation function unit 13 (reference video) and the distribution video with network quality degradation caused in a pseudo manner (degraded video), and measures a video quality index value (DSCQS value) from a difference in image quality between the reference video and the degraded video.

In step S4, the characteristic data creation function unit 14B correlates the network quality scenarios executed in step S2 with the corresponding video quality index values measured in step S3, and models the tendency of changes in the correlation.

In step S5, the characteristic data creation function unit 14B transmits the video quality index model created in step S4 to a video quality index calculation function unit 32B of the client 30 (FIG. 9).

In step S6, the video quality index calculation function unit 32B calculates a video quality index value of the video that is being distributed to the client 30 by referring to the video quality index model using the network quality measured in the network quality characteristic measurement function unit 31. The calculated video quality index value is equivalent to a FR-method value.

A description is given of defining a network quality degradation scenario according to this embodiment.

Figure 11:
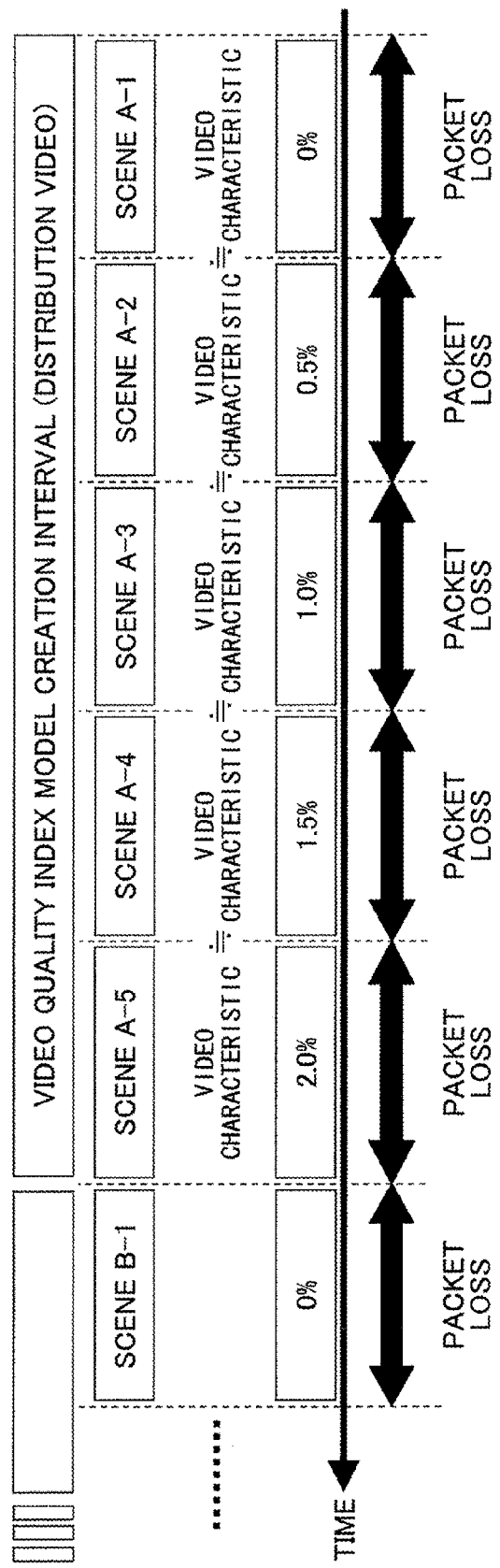
FIG. 11 is a diagram illustrating a method (sequential) of defining a network quality degradation scenario in the pseudo network function unit according to the third embodiment.
Figure 12:
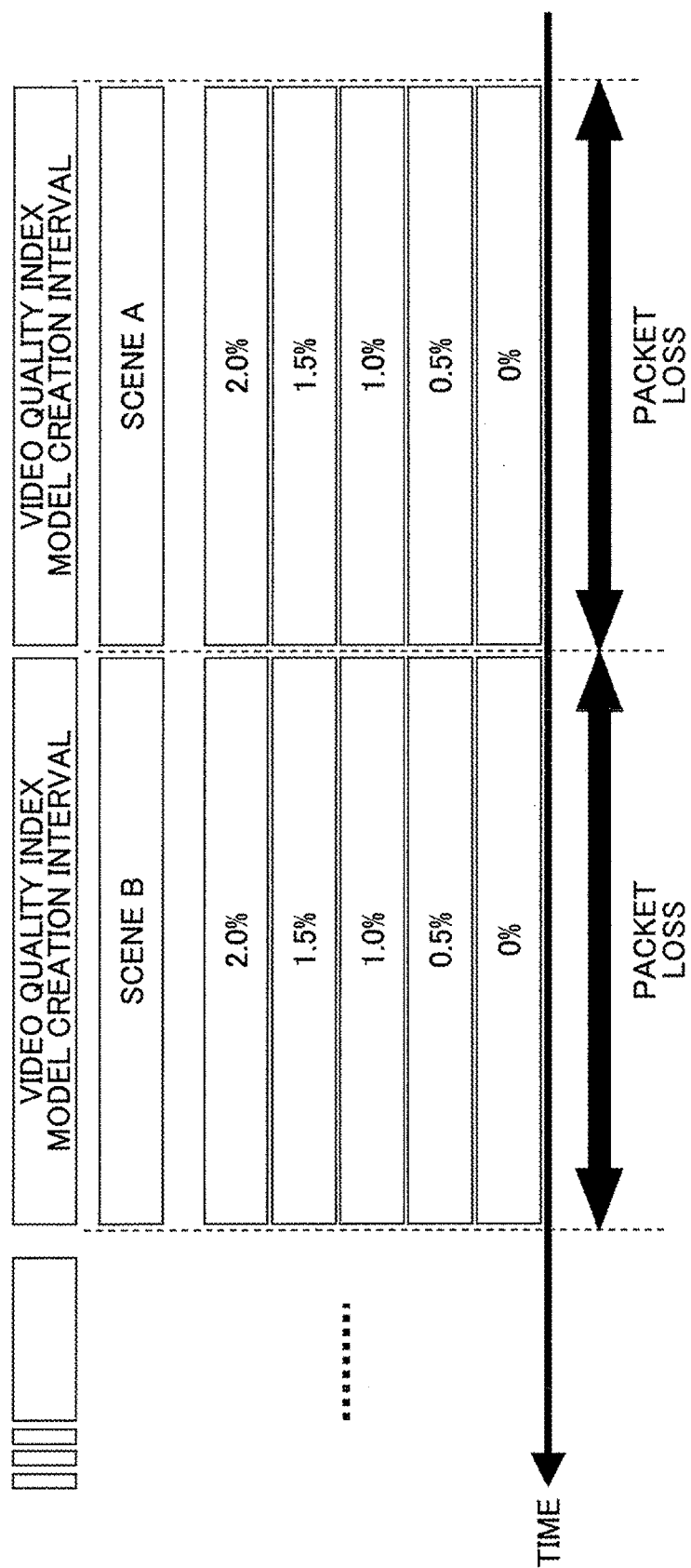
FIG. 12 is a diagram illustrating a method (parallel) of defining a network quality degradation scenario in the pseudo network function unit according to the third embodiment.

FIG. 11 and FIG. 12 are diagrams illustrating methods of defining a network quality degradation scenario in the pseudo network function unit 12 according to this embodiment.

FIG. 11 illustrates a method of sequentially (serially) executing network quality degradation scenarios. In FIG. 11, in a video quality index model creation interval of several seconds to several tens of seconds, network quality degradation scenarios, that is, a packet loss rate of 0%, a packet loss rate of 0.5%, a packet loss rate of 1.0%, a packet loss rate of 1.5%, and a packet loss rate of 2.0%, are sequentially executed based on the assumption that scenes are substantially the same in video characteristics.

FIG. 12 illustrates a method of executing network quality degradation scenarios in parallel. In FIG. 12, network quality degradation scenarios, that is, a packet loss rate of 0%, a packet loss rate of 0.5%, a packet loss rate of 1.0%, a packet loss rate of 1.5%, and a packet loss rate of 2.0%, are executed in parallel for the scene in a video quality index model creation interval of several seconds to several tens of seconds.

Compared with the parallel scenarios, the sequential scenarios may reduce the number of functional components (such as the pseudo network function unit 12 and the video quality evaluation function unit 13) and their workloads. On the other hand, the parallel scenarios, which allow multiple scenarios to be executed for a single scene so that their evaluation scenes may be synchronized, allow video quality to be evaluated with high accuracy.

Next, a description is given of creation of characteristic data.

Figure 13:
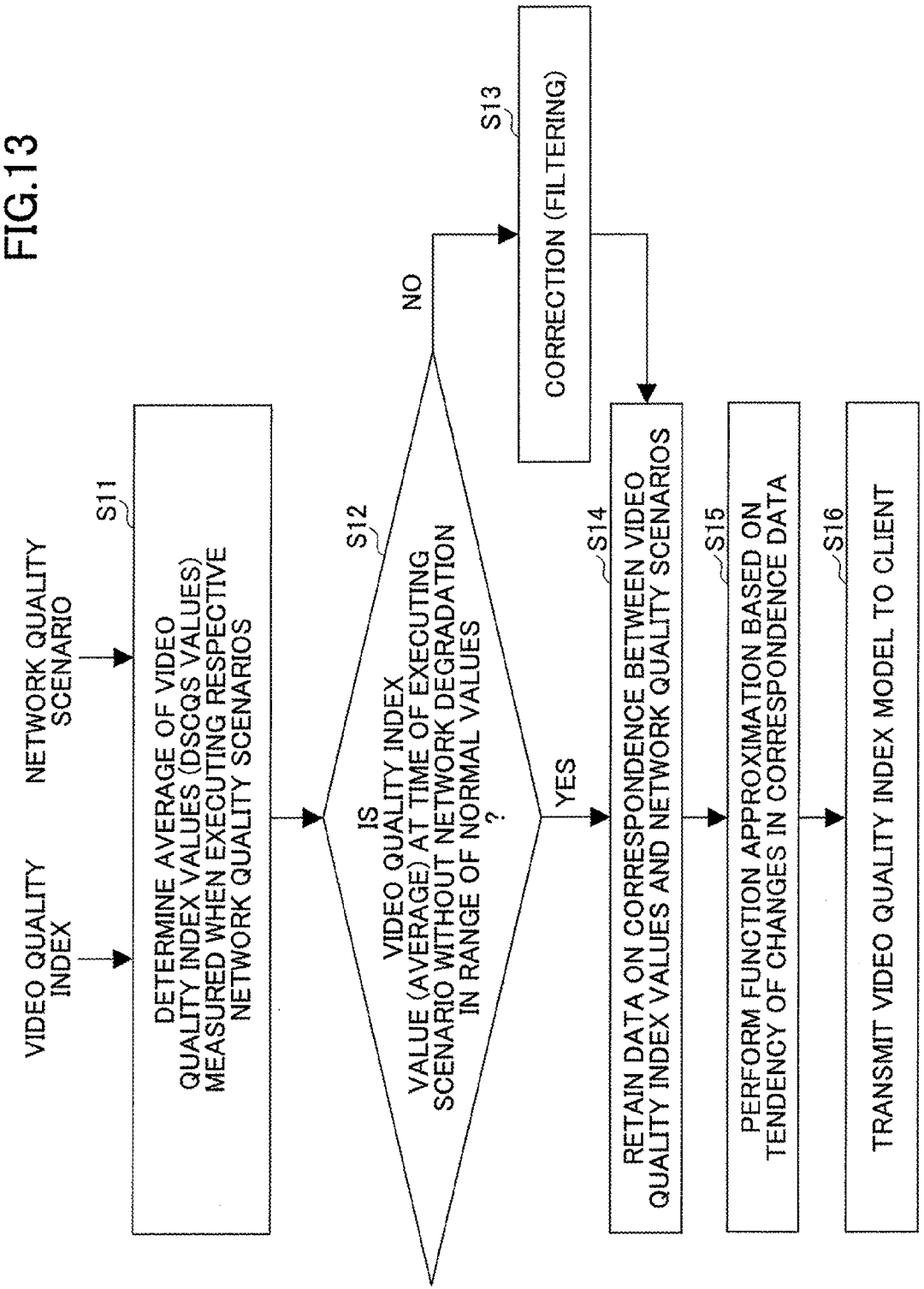
FIG. 13 is a flowchart illustrating a flow of processing by a characteristic data creation function unit according to the third embodiment.

FIG. 13 illustrates a flow of processing by the characteristic data creation function unit 14B.

In step S11, the average of FR video quality index values (DSCQS values) measured during execution of each network quality degradation scenario is determined.

In step S12, it is determined whether the average video quality index value at the time of the scenario of a packet loss rate of 0% is in a range of normal values. If the average video quality index value at the time of the scenario of a packet loss rate of 0% is not in a range of normal values (NO in step S12), in step S13, correction (filtering) is performed, and the process proceeds to step S14. If the average video quality index value at the time of the scenario of a packet loss rate of 0% is in a range of normal values (YES in step S12), the process proceeds directly to step S14.

In step S13, the video quality index correction unit 14e subtracts the average video quality index value in the scenario of a packet loss rate of 0% from each of the average video quality index values obtained in the respective network quality degradation scenarios.

Figure 14:
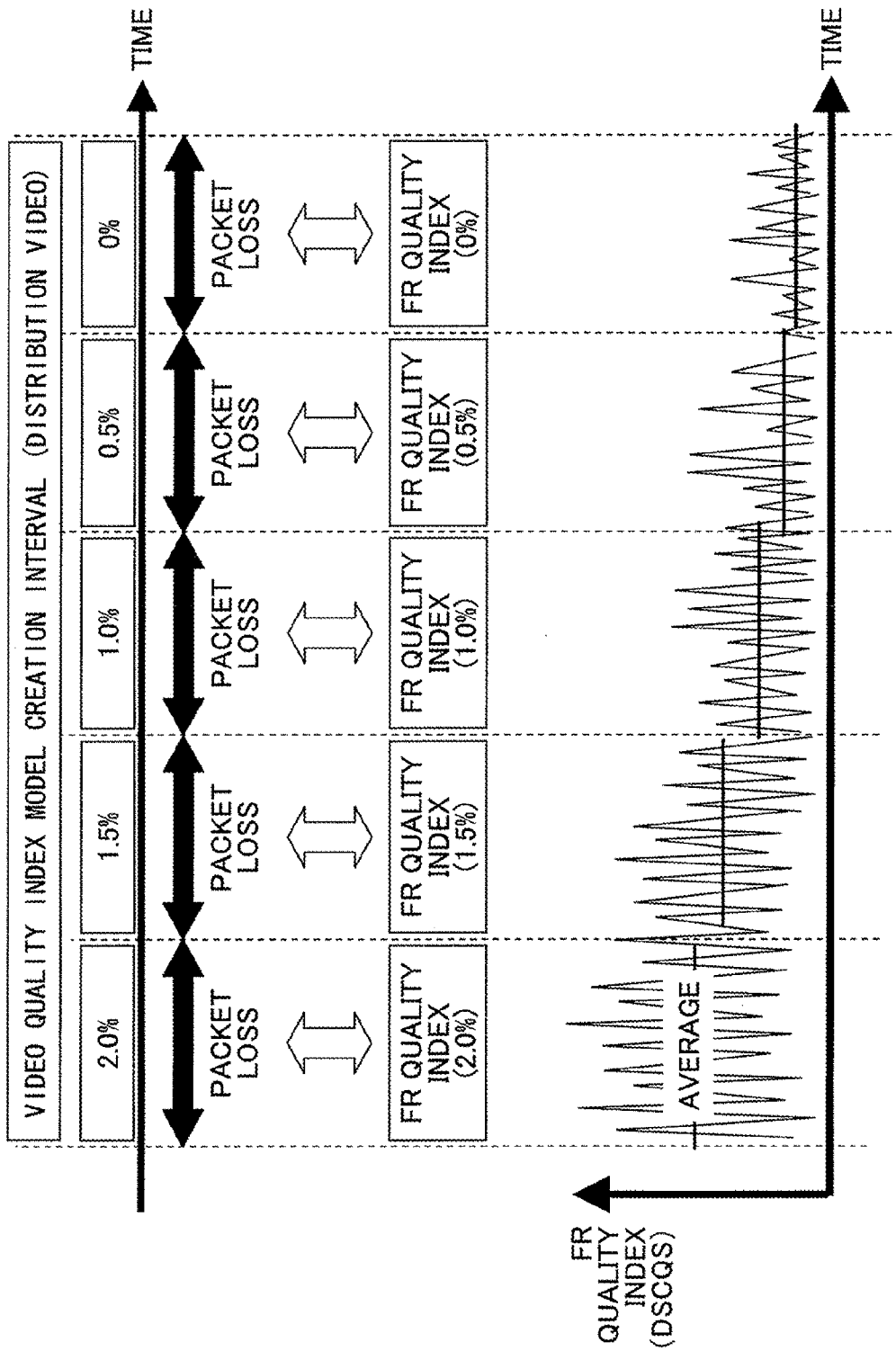
FIG. 14 is a diagram illustrating FR-method video quality index values (DSCQS values) in the case of sequentially executing network quality degradation scenarios according to the third embodiment.
Figure 15:
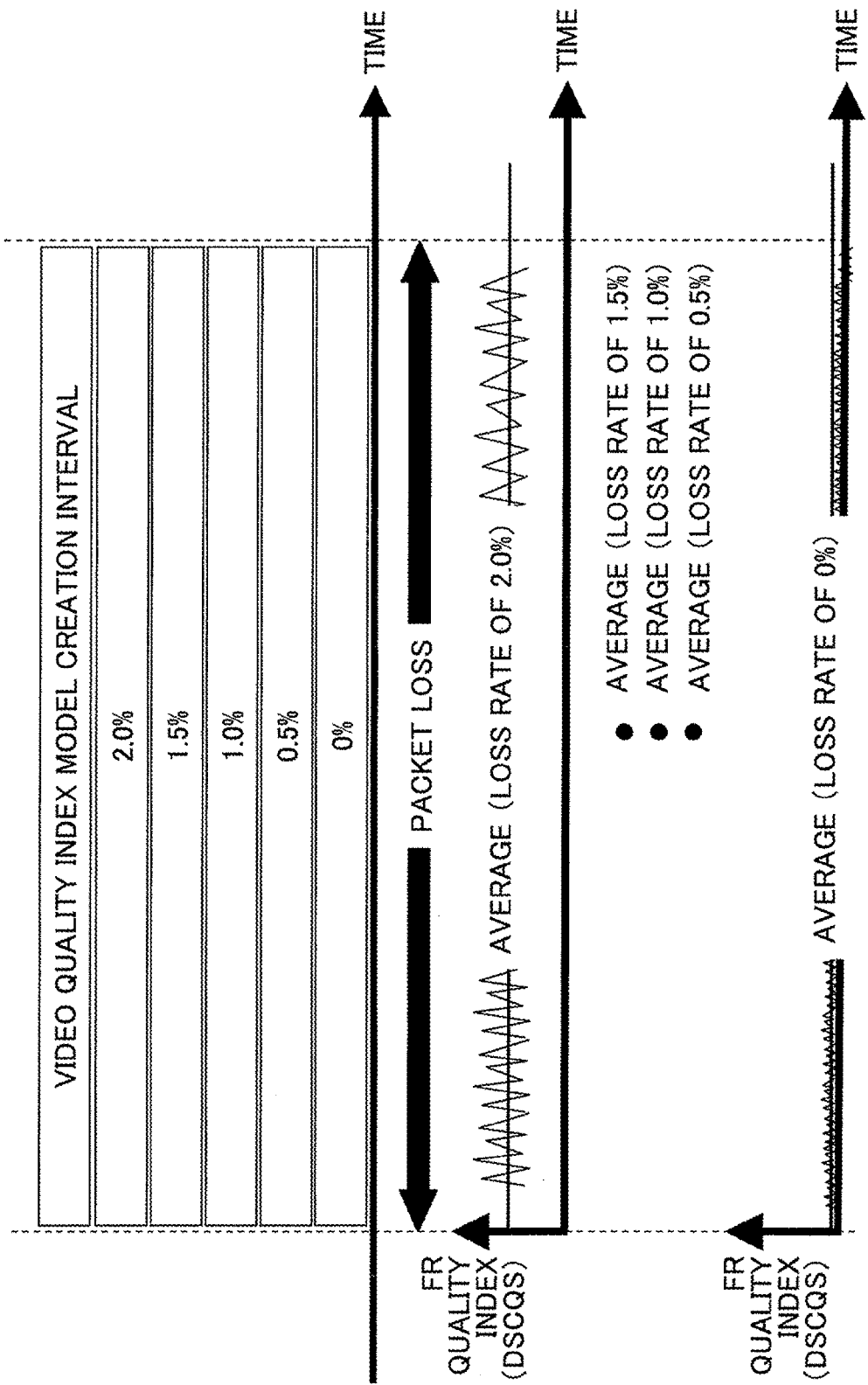
FIG. 15 is a diagram illustrating FR-method video quality index values (DSCQS values) in the case of executing network quality degradation scenarios in parallel according to the third embodiment.

Here, the video quality index is supposed to always present a normal value (a DSCQS average of 0%) at the time of the scenario with no degradation of network quality (a packet loss rate of 0%). An occurrence of asynchronism between reference video and degraded video, however, prevents synchronization of video images, so that the video quality index presents an abnormal value (a DSCQS average greater than 0%). FIG. 14 illustrates FR-method video quality index values (DSCQS values) in the case of sequentially executing network quality degradation scenarios. FIG. 15 illustrates FR-method video quality index values (DSCQS values) in the case of executing network quality degradation scenarios in parallel.

At this point, attention is focused on the fact that the abnormal values presented by the video quality index are due to a factor other than the degradation of network quality, and the average of the video quality index values indicating abnormality in spite of a good network quality scenario (a packet loss rate of 0%) is calculated. Then, the average video quality index values obtained at the times of the respective network quality degradation scenarios are corrected by removing the difference between the average abnormal value and the corresponding normal value, which difference is the average abnormal value itself, from each of the average video quality index values.

Figure 16:
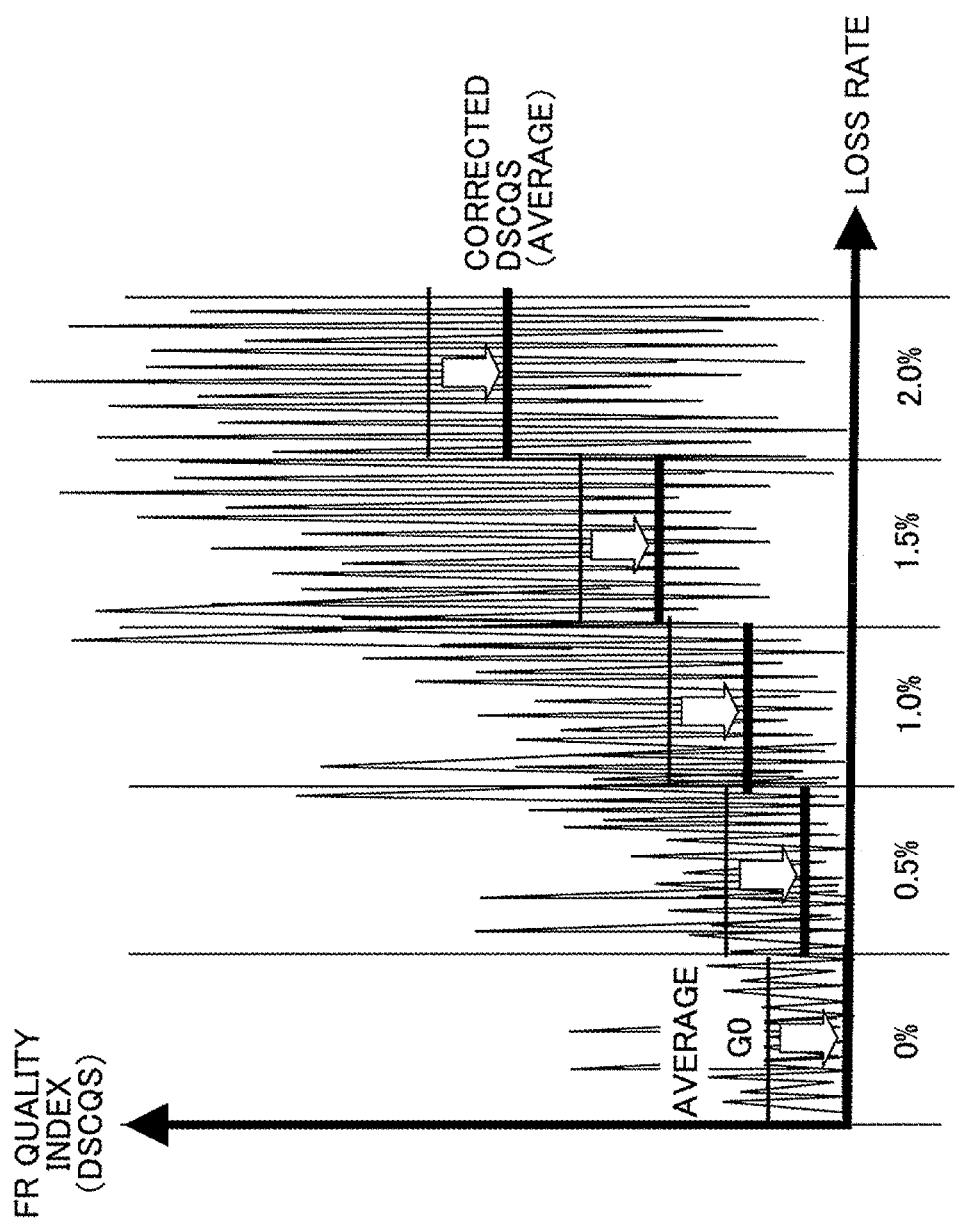
FIG. 16 is a graph illustrating correction of average video quality index values according to the third embodiment.

FIG. 16 illustrates correction of average video quality index values. Here, at the time of a packet loss rate of 0%, the average DSCQS value, which is G0 (abnormal value), minus 0 (normal value) equals G0 (G0−0=G0). Further, if the average DSCQS value at the time of a packet loss rate of x % is Gx, Gx is corrected to Gx−G0.

Figure 17:
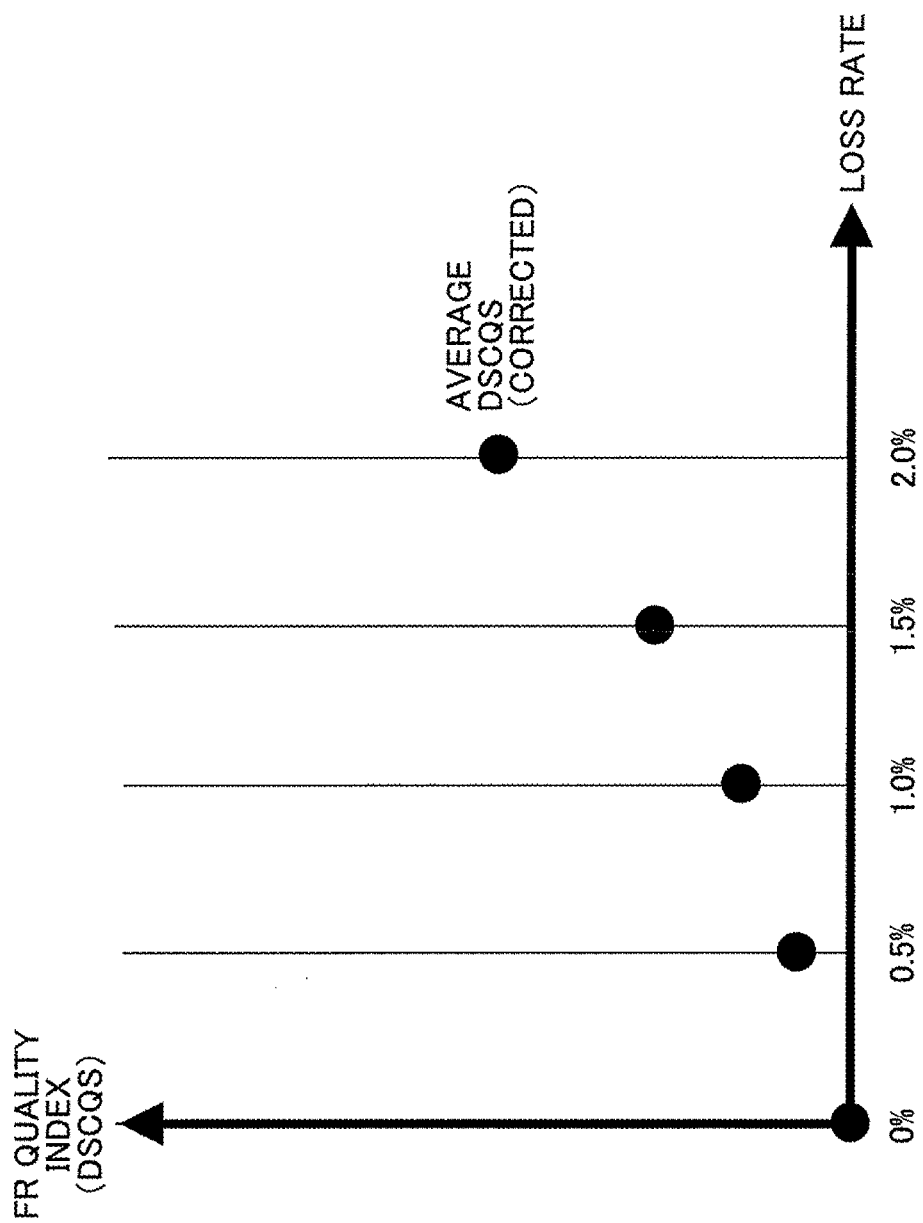
FIG. 17 is a graph illustrating a profile according to the third embodiment.

In step S14, the measured value mapping function unit 14$f$ retains a profile, which is data on the correspondence between the packet loss rates of the respective network quality degradation scenarios and the corrected average video quality index values. FIG. 17 illustrates an example profile.

Figure 18:
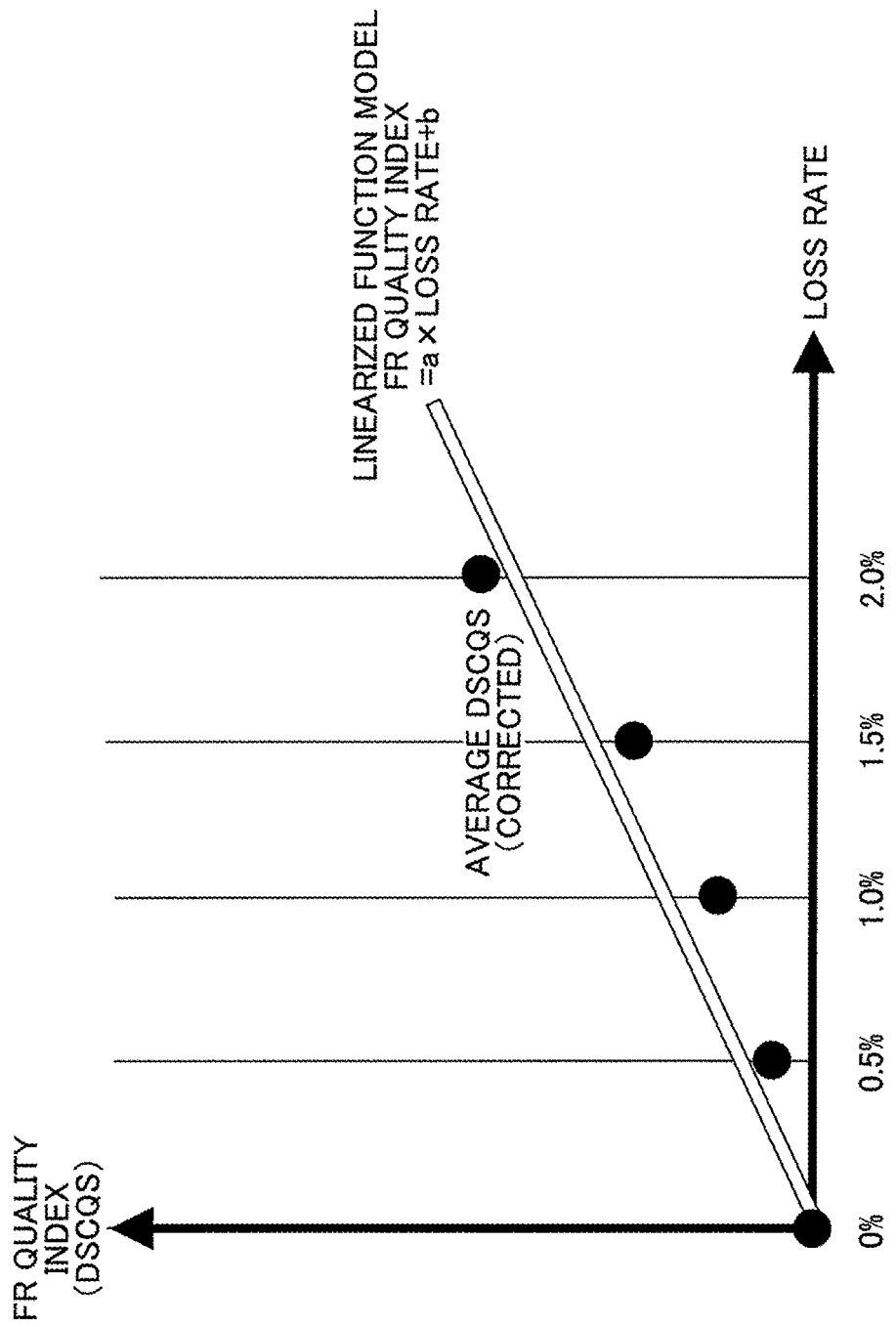
FIG. 18 is a graph illustrating linear least squares approximation according to the third embodiment.

In step S15, the video quality index model creation unit 14$g$ performs linear least squares approximation as illustrated in FIG. 18 in order to model the tendency of changes in the profile, that is, the correspondence data of the packet loss rate and the video quality index value (average DSCQS value).

As a result of the liner least squares approximation, the following formula is obtained:

Video quality index value=$a$×packet loss rate+$b$, where a and b are function parameters.

This method takes advantage of a characteristic of the DSCQS value that it presents linear changes relative to small variations in the packet loss rate.

In the case of using a DSCQS value as a video quality index value, the function parameter b is zero (b=0) because correction is performed in step S13. However, in the case of using video quality index values other than the DSCQS value, b may not be zero (b≠0). Accordingly, the parameters a and b are used. Further, the linear least squares approximation may be replaced with curve fitting. In this case, three or more function parameters are employed.

In step S16, the video index data transmission unit 14$h$ transmits the parameters a and b to the video quality index calculation function unit 32B of the client 30 (FIG. 9) with respect to the video quality index model converted into a function (video quality index value=$a$×packet loss rate+b).

Next, a description is given of calculating the video quality index value of distributed video.

The video quality index calculation function unit 32B receives the parameters a and b from the characteristic data creation function unit 14B, and also receives a packet loss rate from the network quality characteristic measurement function unit 31 at regular intervals.

The video quality index calculation function unit 32B calculates a video quality index value corresponding to a measured packet loss rate based on the following equation:

Video quality index value=$a$×measured packet loss rate+$b$.

Further, the video quality index calculation function unit 32B has a threshold for determining whether the video quality has degraded with respect to the calculated video quality index value. If the calculated video quality index value exceeds the threshold, the video quality index calculation function unit 32B determines that the quality of the video that is being viewed by a user has degraded, and transmits alarm information to the network management system 40.

FIG. 19 illustrates calculation of the video quality index value of distributed video in the video quality index calculation function unit 32B. Here, in order for "a scene subjected to evaluation at the time of creating a video quality index model" to be the same as "a scene where the video quality is estimated in a client (using the created video quality index model)," a time (period) for creating a video quality index model is made equal to a period for measuring a packet loss rate. The calculation of a video quality index value in the client 30 is started in response to reception of video quality index data (function parameters), that is, using reception of video quality index data as a trigger.

Thus, according to one aspect of the present invention, a function is provided for automatically correlating one or more network characteristics with a video quality index (a conventional index value at an image level) for each of the scenes of distribution video, so that it is possible to automatically construct a video quality index that cannot be provided by the conventional evaluation method (that is, video quality index values correlated with network quality in view of one or more video scene characteristics).

Here, the FR-type video quality index calculation function unit 13$c$ (FIG. 9) obtains a DSCQS value that is an FR-type video quality index from two kinds of input video, that is, reference video and degraded video. Therefore, it is desirable to evaluate these two kinds of video in perfect synchronization. However, it is difficult to evaluate the reference video and the degraded video synchronously because of lack of clock synchronization between functional components, for example. Further, the DSCQS value obtained from the reference video and the degraded video varies greatly. However, according to this embodiment, the video quality index correction unit 14$e$ is provided so that it is possible to obtain a profile where the relationship between the video quality index value (DSCQS value) and the packet loss rate is accurately mapped. Further, in place of the profile, the function parameters a and b are transmitted from the distribution server 10 to each of the clients 30. Therefore, it is possible to reduce the traffic load of the communication network 20.

According to the above-described embodiments, the pseudo network function unit 12 may be used as a degraded video generation unit, the video quality evaluation function unit 13 may be used as a video quality index value measurement unit, each of the characteristic data creation function units 14A and 14B may be used as a characteristic data creation unit, each of the characteristic data creation function unit 14A, the video index data transmission unit 14$h$, and the quality characteristic measurement function unit 31 may be used as a transmission unit, the video quality index correction unit 14e may be used as a correction unit, the video quality index model creation unit 14g may be used as a function approximation unit, the network quality characteristic measurement unit 31 may be used as a quality degradation value measurement unit, and each of the video quality index calculation function units 32A and 32B may be used as a video quality index value calculation unit and an alarm generation unit.

According to one aspect of the present invention, a video quality monitoring method includes a distribution server measuring a plurality of first video quality index values according to a full-reference method by comparing a video, distributed from the distribution server to a client through a network, with a degraded video, generated by causing a plurality of scenarios of quality degradation due to the network in the video in a pseudo manner; the distribution server creating characteristic data of a plurality of first quality degradation values, obtained by causing the quality degradation to vary with the scenarios at regular intervals, and the first video quality index values corresponding to the respective scenarios; the client measuring a second quality degradation value in the video distributed through the network, and transmitting the measured second quality degradation value to the distribution server; and the distribution server calculating a second video quality index value, equivalent to a value according to the full-reference method, of the distributed video from the transmitted measured second quality degradation value and the characteristic data.

According to one aspect of the present invention, a client configured to receive a video distributed from a distribution server through a network includes a quality degradation value measurement unit configured to measure a quality degradation value in the video distributed through the network; and a video quality index value calculation unit configured to receive characteristic data transmitted from the distribution server at regular intervals and to calculate a video quality index value, equivalent to a value according to a full-reference method, of the distributed video from the measured quality degradation value and the characteristic data.

The client as set forth above may further include an alarm generation unit configured to generate an alarm in response to the video quality index value calculated by the video quality index value calculation unit exceeding a threshold.

According to one aspect of the present invention, a client configured to receive a video distributed from a distribution server through a network includes a quality degradation value measurement unit configured to measure a quality degradation value in the video distributed through the network; and a transmission unit configured to transmit the measured quality degradation value to one of the distribution server and a network management system connected to the network.

All examples and conditional language recited herein are intended for pedagogical purposes to aid the reader in understanding the invention and the concepts contributed by the inventors to furthering the art, and are to be construed as being without limitation to such specifically recited examples and conditions, nor does the organization of such examples in the specification relate to a showing of the superiority or inferiority of the invention. Although the embodiments of the present inventions have been described in detail, it should be understood that various changes, substitutions, and alterations could be made hereto without departing from the spirit and scope of the invention.

What is claimed is:

1. A distribution server configured to distribute a video to a client through a network, the distribution server comprising:
   a degraded video generation unit configured to generate a degraded video by causing a plurality of scenarios of quality degradation due to the network in the video in a pseudo manner;
   a video quality index value measurement unit configured to measure a plurality of first video quality index values according to a full-reference method by comparing the video with the degraded video;
   a characteristic data creation unit configured to create characteristic data of a plurality of first quality degradation values, obtained by causing the quality degradation to vary with the scenarios at regular intervals, and the first video quality index values corresponding to the respective scenarios; and
   a video quality index value calculation unit configured to receive a second quality degradation value in the video measured and transmitted by the client, and to calculate a second video quality index value, equivalent to a value according to the full-reference method, of the distributed video from the received measured second quality degradation value and the characteristic data.

2. The distribution server as claimed in claim 1, wherein the characteristic data creation unit includes:
   a correction unit configured to correct an average of the first video quality index values corresponding to one of the scenarios without the quality degradation to zero with respect to an average of the first video quality index values of each of the scenarios corresponding to the respective first quality degradation values.

3. The distribution server as claimed in claim 2, wherein the characteristic data creation unit further includes:
   a function approximation unit configured to approximate data on a correspondence between the first quality degradation values and the corrected averages of the first video quality index values of the respective scenarios to a function, and to determine a plurality of function parameters of the function as the characteristic data.

4. The distribution server as claimed in claim 1, wherein the characteristic data creation unit is configured to determine a profile as the characteristic data, the profile being data on a correspondence between the first quality degradation values and averages of the first video quality index values of the respective scenarios.

5. The distribution server as claimed in claim 1 wherein the degraded video generation unit is configured to generate the degraded video by serially executing the scenarios of the quality degradation and causing the quality degradation due to the network to vary with the serially-executed scenarios.

6. The distribution server as claimed in claim 1, wherein the degraded video generation unit is configured to generate the degraded video by executing the scenarios of the quality degradation in parallel and causing the quality degradation due to the network to vary with the scenarios executed in parallel.

* * * * *